(12) United States Patent
Wiemker et al.

(10) Patent No.: US 9,129,360 B2
(45) Date of Patent: Sep. 8, 2015

(54) VISUALIZATION APPARATUS FOR VISUALIZING AN IMAGE DATA SET

(75) Inventors: Rafael Wiemker, Kisdorf (DE); Thomas Buelow, Grosshansdorf (DE); Cristian Lorenz, Hamburg (DE); Torbjorn Vik, Hamburg (DE); Sven Kabus, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 491 days.

(21) Appl. No.: 13/376,213

(22) PCT Filed: Jun. 2, 2010

(86) PCT No.: PCT/IB2010/052464
§ 371 (c)(1),
(2), (4) Date: Dec. 5, 2011

(87) PCT Pub. No.: WO2010/143100
PCT Pub. Date: Dec. 16, 2010

(65) Prior Publication Data
US 2012/0081386 A1 Apr. 5, 2012

(30) Foreign Application Priority Data
Jun. 10, 2009 (EP) .................................... 09162344
Nov. 23, 2009 (EP) .................................... 09176714

(51) Int. Cl.
*G09G 5/02* (2006.01)
*G06T 7/00* (2006.01)
(Continued)

(52) U.S. Cl.
CPC ............. *G06T 7/0012* (2013.01); *G06T 11/001* (2013.01); *G06T 19/00* (2013.01);
(Continued)

(58) Field of Classification Search
None
See application file for complete search history.

(56) References Cited

U.S. PATENT DOCUMENTS 7,272,251 B2 * 9/2007 Acar et al. .................... 382/128
2005/0152588 A1 7/2005 Yoshida et al.
(Continued)

FOREIGN PATENT DOCUMENTS

WO 2005055141 A1 6/2005
WO 2006000942 A2 1/2006

OTHER PUBLICATIONS

Dehmeshki, J., et al.; A Hybrid Approach for Automated Detection of Lung Nodules in CT Images; 2006; IEEE Trans. on Biomedical Imaging; pp. 506-509.
(Continued)

*Primary Examiner* — Stephen R Koziol
*Assistant Examiner* — Khoa Vu

(57) ABSTRACT

The invention relates to a visualization apparatus (1) for visualizing an image data set. The visualization apparatus (1) comprises an image data set providing unit (2) for providing the image data set, a differential property determination unit (5) for determining local differential properties for different regions of the image data set, an assigning unit (6) for assigning visualization properties to the different regions of the image data set depending on the determined local differential properties, wherein a visualization property defines the visualization of a region, to which the visualization property is assigned, and a display unit (7) for displaying the visualization properties assigned to the different regions of the image data set. By displaying the visualization properties assigned to the different regions of the image data set different objects can visually be separated from each other without requiring large computational costs.

17 Claims, 9 Drawing Sheets

(51) Int. Cl.
*G06T 11/00* (2006.01)
*G06T 19/00* (2011.01)

(52) U.S. Cl.
CPC .. *G06T 2200/24* (2013.01); *G06T 2207/10081* (2013.01); *G06T 2207/10088* (2013.01); *G06T 2207/10132* (2013.01); *G06T 2207/20021* (2013.01); *G06T 2207/20092* (2013.01); *G06T 2207/30064* (2013.01); *G06T 2210/41* (2013.01); *G06T 2219/028* (2013.01); *G06T 2219/2012* (2013.01)

(56) References Cited

U.S. PATENT DOCUMENTS

| | | | |
|---|---|---|---|
| 2008/0080770 | A1 | 4/2008 | Mendonca et al. |
| 2008/0144911 | A1* | 6/2008 | Russakoff .................... 382/132 |
| 2008/0187218 | A1* | 8/2008 | Strom ........................... 382/166 |
| 2008/0192887 | A1 | 8/2008 | Weese et al. |
| 2008/0205719 | A1* | 8/2008 | Pekar et al. .................. 382/128 |
| 2008/0267499 | A1 | 10/2008 | Deischinger et al. |
| 2010/0054525 | A1* | 3/2010 | Gong et al. ................... 382/100 |
| 2010/0310035 | A1* | 12/2010 | Proksa ............................. 378/4 |
| 2011/0007933 | A1* | 1/2011 | Lempitsky .................... 382/100 |
| 2011/0052018 | A1* | 3/2011 | Blaffert et al. ................ 382/128 |
| 2011/0069875 | A1* | 3/2011 | Goto ............................. 382/131 |
| 2012/0296771 | A1* | 11/2012 | Vincent et al. ............. 705/26.41 |

OTHER PUBLICATIONS

Gori, I., et al.; Lung Nodule Detection in Screening Computed Tomography; 2006; IEEE Trans. on Nuclear Science Symposium Conference; pp. 3489-3491.

Lovanyi, I., et al.; New Technologies in Medical Imaging: New Challenges in Picture Evaluation; 2008; INES, 12th Int'l. Conf. on Intelligent Engineering Systems; pp. 221-225.

Wiemker, R., et al.; Aspects of computer-aided detection (CAD) and volumetry of pulmonary nodules using multislice CT; 2005; The British Journal of Radiology; 78(1)S46-S56.

Wiemker, R., et al.; Agreement of CAD features with expert observer ratings for characterization of pulmonary nodules in CT using the LIDC-IDRI database; 2009; SPIE Medical Imaging; vol. 7260; 12 pages.

Ye, X., et al.; Shape-based Computer-aided Detection of Lung Nodules in Thoracic CT Images; 2009; IEEE Trans. on Biomedical Engineering; 56(7)1810-1820.

* cited by examiner

VISUALIZATION APPARATUS FOR VISUALIZING AN IMAGE DATA SET

FIELD OF THE INVENTION

The present invention relates to a visualization apparatus and a visualization method for visualizing an image data set. The invention relates further to a corresponding computer program for visualizing an image data set.

BACKGROUND OF THE INVENTION

US 2008/0080770 A1 discloses a method and a system for visualizing regions in an image data set, and, in particular, discloses a method for assigning labels to regions in an image data set. The method comprises the steps of deriving a probabilistic model for a plurality of geometrical structures, computing a regional response around a region in the image data set, computing a region score for each geometrical structure using the plurality of probabilistic models and labeling the region in the image data set based on the region score. In a particular embodiment, the principle curvatures of iso-surfaces at each voxel of the image data set are used as the regional response and the region score represents the probability of observing the computed curvature data for a region corresponding to a specific anatomical structure, such as a vessel or a nodule. The labeled regions may then be displayed to a radiologist with different colors for different anatomical structures.

This visualization of the image data set needs at lot of computational intensive calculations like the derivation of a plurality of probabilistic models for a plurality of geometrical structures, computing a regional response around a region in the image data set and computing a region score for each geometrical structure using the plurality of probabilistic models. The visualization of the image data set such that different objects are visually separated from each other requires therefore large computational costs.

SUMMARY OF THE INVENTION

It is an object of the present invention to provide a visualization apparatus, a visualization method and a computer program for visualizing an image data set such that different objects are visually separated from each other with reduced computational costs.

In a first aspect of the present invention a visualization apparatus for visualizing an image data set is presented, wherein the visualization apparatus comprises:

an image data set providing unit for providing the image data set, a differential property determination unit for determining local differential properties for different regions of the image data set, an assigning unit for assigning visualization properties to the different regions of the image data set depending on the determined local differential properties, wherein a visualization property defines the visualization of a region, to which the visualization property is assigned, a display unit for displaying the visualization properties assigned to the different regions of the image data set.

Different objects shown in the provided image date set are supposed to have different local differential properties. Therefore, by determining local differential properties for different regions of the provided image data set and by assigning visualization properties to the different regions of the image data set depending on the determined local differential properties, to different regions comprising different local differential properties different visualization properties can be assigned, thereby allowing to visualize regions having different local differential properties, i.e. showing different objects, differently, by displaying the visualization properties assigned to the different regions of the image data set. Thus, by displaying the visualization properties assigned to the different regions of the image data set different objects can visually be separated from each other. Moreover, since it is just required to determine the local differential properties and to perform an assignment procedure, i.e. since it is not necessary to perform calculations like a derivation of a plurality of probabilistic models for a plurality of geometrical structures, computing a regional response around a region in the image data set and computing a region score for each geometrical structure using the plurality of probabilistic models, the image data set can be visualized such that different objects are visually separated from each other with reduced computational costs.

Since the local differential properties generally give an indication of the shape of the object in the respective region of the image data set, the local differential properties can also be regarded as local differential geometrical properties.

The image data set is preferentially an image data set of a computed tomography imaging system, a magnetic resonance imaging system, a nuclear imaging system like a single photon emission computed tomography imaging system or a positron emission computed tomography imaging system, or an ultrasound imaging system. The image data set can also be an image data set of another imaging modality. The image data set is preferentially a medical image data set, in particular, an image data set showing a part of a person or of an animal like an image data set showing the lung or another organ of a person.

The image data set providing unit can be a storing unit, in which the image data set is stored and from which the image data set can be retrieved for providing the image data set. The image data set providing unit can also be an imaging system which generates the image data set like the imaging systems mentioned above. The image data set providing unit can also be a transfer unit allowing transferring the image data set to the differential property determination unit directly or via another unit for providing the image data set. For example, the image data set providing unit can be a wired or wireless data transmission unit or an optical data transmission unit.

The visualization properties, which are assigned to the different regions of the image data set, are preferentially different colors, wherein a color is preferentially defined by coordinates of a color coordinate system like a RGB system or a HSV system. Thus, preferentially to the different regions a R value, a G value, a B value or a H value, a S value, a V value are assigned for assigning visualization properties to the different regions of the image data set. In addition or alternatively also other visualization properties can be assigned to the different regions, for example, different degrees of transparency.

The differential property determination unit can be adapted to determine different local differential properties for the same region of the image data set. The assigning unit is then preferentially adapted to combine the local differential properties determined for the same region and to assign a visualization property, for example, a color, to this combination. This combination can be a linear combination or a non-linear combination.

A region of the image data set is preferentially a single image element or a group of image elements, wherein an image element is preferentially a voxel, if the image data set is a three-dimensional image data set, or a pixel, if the image data set is a two-dimensional image data set.

It is preferred that the visualization apparatus further comprises a smoothing unit for smoothing the image data set in accordance with a degree of smoothing.

It is further preferred that the visualization apparatus comprises a smoothing setting unit for allowing a user to set the degree of smoothing.

The visibility of certain objects or structures can be increased and the visibility of other objects or structures can be decreased by modifying the degree of smoothing. For example, if the degree of smoothing is large, the visibility of small and fine objects or structures can be decreased, whereas the visibility of coarser objects or structures can be increased. Correspondingly, small and fine structures can become more and more visible, if the degree of smoothing is decreased. Thus, the degree of smoothing can be adapted to the desired object or structure, which should be visualized, in particular, detected, within the image data set. For example, a user can modify the degree of smoothing by using the smoothing setting unit such that the user can detect the desired object or structure. For example, if the image data set is a medical image data set and the user wants to detect regions being suspicious of indicating cancer, the user can modify the degree of smoothing such that a region becomes visible which is suspicious of indicating cancer.

The smoothing setting unit comprises preferentially a graphical user interface allowing a user to set and modify the degree of smoothing. The graphical user interface is, for example, a slide control shown on the display unit.

The smoothing unit is preferentially adapted to apply a Gaussian filter to the image data set for smoothing the image data set. Different degrees of smoothing are preferentially achieved by applying different Gaussian filters having different filter widths to the image data set. Instead of or in addition to using a Gaussian filter, another smoothing filter can be used for smoothing the image data set.

Preferentially, the visualization apparatus is adapted to smooth the image data set before determining the local differential properties. As will be explained in more detail further below, if several local differential properties are determined for the same region, preferentially several different differential filters are applied to the image data set resulting in several differentiated image data sets. If the smoothing is performed after this differentiation, instead of smoothing only one image data set, the several differentiated image data sets have to be smoothed. Thus, by firstly performing the smoothing operation and by then performing the differentiation operation, the computational costs can be further reduced.

The different degrees of smoothing can be regarded as different resolution scales.

It is further preferred that the visualization apparatus comprises a storing unit, wherein the smoothing unit is adapted to smooth the image data set several times in accordance with different degrees of smoothing for generating several differently smoothed image data sets, wherein the differential property determination unit is adapted to determine several local differential properties of the different regions for the differently smoothed image data sets, wherein the storing unit is adapted to store the several local differential properties of the different regions determined for the differently smoothed image data sets, wherein, if a degree of smoothing is set by using the smoothing setting unit, the assigning unit is adapted to retrieve from the storing unit the local differential properties, which have been determined for a smoothed image data set which corresponds to the set degree of smoothing, and to assign the visualization properties to the different regions of the image data set depending on the retrieved local differential properties.

Since after the local differential properties of the different regions for the differently smoothed image data sets have been stored in the storing unit, they can be retrieved without the need of calculating them again, the display of the visualization properties assigned to the different regions can be very fast adapted to a degree of smoothing set by a user by using the smoothing setting unit, in particular, in real-time.

It is further preferred that the differential property determination unit is adapted to determine several local differential properties of the same region for different degrees of smoothing of the image data set, wherein the assigning unit is adapted to assign a visualization property to a weighted combination of the several local differential properties of the same region.

It is preferred that the visualization apparatus further comprises a smooth degree weight setting unit for allowing a user to set smooth degree weights for the weighted combination of the several local differential properties.

The smooth degree weight setting unit comprises preferentially a graphical user interface allowing a user to set the smooth degree weights. This graphical user interface comprises, for example, several slide controls for modifying the weights of the contributions of the local differential properties which have been determined for different degrees of smoothing.

It is further preferred that the visualization apparatus comprises a storing unit for storing the several local differential properties of the same region determined for the different degrees of smoothing of the image data set, wherein, if smooth degree weights are set by using the smooth degree weight setting unit, the assigning unit is adapted to retrieve from the storing unit the several local differential properties of the same region and to assign the visualization property to a weighted combination of the several retrieved local differential properties in accordance with the smooth degree weights set by using the smooth degree weight setting unit.

Since, after the several local differential properties of the same region have been determined for the different degrees of smoothing of the image data set and after they have been stored in the storing unit, it is not necessary to calculate them again and since they have just to be retrieved from the storing unit, the display of the visualization properties can very fast be adapted to the smooth degree weights set by a user by using the smooth degree weight setting unit, in particular, in real-time.

It is preferred that the visualization apparatus further comprises a resolution reduction unit for reducing the resolution of the image data set.

A reduction of the resolution of the image data set means preferentially that the number of image elements, for example, the number of voxels or the number of pixels, is reduced. This further reduces computational costs required for, for example, determining the local differential properties, assigning visualization properties to different regions of the image data set, and displaying the visualization properties. The reduction of the resolution is preferentially performed before determining the local differential properties and preferentially after the image data set has been smoothed.

It is preferred that the resolution reduction unit is adapted to reduce the resolution in accordance with the degree of smoothing such that all features shown in the smoothed image data set are maintained.

The smoothing operation is a low-pass filtering operation, wherein high frequencies are removed from the image data set. The highest frequency, which can pass this low-pass filter, is defined by the degree of smoothing, and the resolution of the image data set is preferentially reduced such that this highest frequency, which passes the low-pass filter, can still be detected in the image data set under consideration of the Nyquist criterion. This allows further reducing the required computational costs, without removing structural information from the image data set.

It is further preferred that the differential property determination unit is adapted to determine at least one of an eigenvalue of a local Hesse matrix and a local shape index as local differential properties. In a preferred embodiment, the differential property determination unit is adapted to determine eigenvalues of a Hesse matrix as local differential properties.

The eigenvalues of the Hesse matrix are very suitable to distinguish between planar, tubular, and nodular structures. Therefore, if, for example, a user wants to detect nodular structures in an image data set of a person or of an animal, these nodular structures can easily be detected by using the eigenvalues of the Hesse matrix as local differential properties.

It is further preferred that the differential property determination unit is adapted to determine at least one of a) a weakest eigenvalue of a local Hesse matrix, and b) a mean local shape index by determining the local shape index for the different regions of the image data set and averaging the local shape index determined for the different regions, as the local differential properties. Preferentially, the assigning unit is adapted to assign at least one of a) a color saturation depending on the weakest eigenvalue of the local Hesse matrix, and b) a color hue depending on the mean local shape index, to the different regions.

The eigenvalues can be positive or negative. The eigenvalues are preferentially ordered according to their absolute magnitude, while their sign is retained. The weakest eigenvalue is preferentially the eigenvalue with the smallest absolute magnitude, and the strongest eigenvalue is preferentially the eigenvalue with the largest absolute magnitude, i.e. the strength of an eigenvalue depends preferentially on its absolute magnitude.

It has been found that, if the image data set shows a part of a person like an organ of a person, the local shape index and the weakest eigenvalue of the local Hesse matrix can be indicative for nodular structures such as tumors and lymph nodes. In particular, high values of the local shape index and the weakest eigenvalue of the local Hesse matrix can be indicative for the nodular structures. Moreover, it has been found that the mean local shape index can be indicative for tumor malignancy. In particular, it has been found that low values of the mean local shape index are indicative for tumor malignancy. The determination of the weakest eigenvalue of the local Hesse matrix, the local shape index, and the mean local shape index can therefore be used for indicating regions of the image data set, which may show nodular structures such as tumors and lymph nodes, wherein the degree of malignancy of the respective nodular structure can be visualized. In particular, the degree of tumor malignancy is visualized by assigning a color hue to the regions depending on the mean local shape index and by assigning a color saturation to the regions depending on the weakest eigenvalue of the local Hesse matrix. For example, a low mean local shape index indicating a large degree of tumor malignancy is a assigned to a red color and a high mean local shape index indicating a low degree of tumor malignancy is assigned to a green color hue. The mean local shape index is therefore preferentially mapped onto a malignancy color scale, for example, green-to-red, by the assigning unit for determining a color hue of a region, in particular, of a voxel. The averaging of the local shape index for determining the mean local shape index is preferentially performed by applying a Gaussian smoothing filter to the local shape indices determined for the different regions.

The local shape index is preferentially a value which is based on the curvature of an isophote surface through the respective region of the image data set which is preferentially comprised of a two-dimensional or three-dimensional gray-value volume. The isophote surface is preferentially implicitly defined as the surface orthogonal to a gradient vector at the respective region, for example, at the respective voxel. The local shape index is known from, for example, the article "Agreement of CAD features with expert observer ratings for characterization of pulmonary nodules in CT using the LIDC-IDRI database", Rafael Wiemker et al., SPIE Medical Imaging 2009, SPIE vol. 7260, which is herewith incorporated by reference.

As already mentioned above, the weakest eigenvalue typically corresponds to nodular structures such as tumors, in particular, if all three eigenvalues of the local Hesse matrix are negative. The second strongest eigenvalue typically corresponds to tubular structures such as vessels, in particular, if the two strongest eigenvalues are negative, and airways, in particular, if the two strongest eigenvalues are positive. The strongest eigenvalue of the local Hesse matrix typically corresponds to planar structures such as lobar fissures, in particular, if the strongest eigenvalue is negative and the other two eigenvalues are vanishing. The differential property determination unit can therefore also be adapted to determine these further eigenvalues of the local Hesse matrix as local differential properties to which visualization properties like colors are assigned by the assigning unit.

It is further preferred that the differential property determination unit is adapted to determine several local differential properties for a same region of the different regions of the image data set, wherein the assigning unit is adapted to assign a visualization property to a weighted combination of the several local differential properties of the same region.

Thus, preferentially for the same degree of smoothing and for the same region of the image data set, in particular, for the same voxel, several local differential properties are determined, which are preferentially the eigenvalues of a Hesse matrix, the local shape index and/or the mean local shape index.

It is preferred that the visualization apparatus further comprises a property weight setting unit for allowing a user to set property weights for the weighted combination of the several local differential properties of the same region of the image data set.

Different local differential properties, which have been determined for the same region, can be indicative of different kind of structures and, thus, of different objects. Thus, by giving a certain local differential geometrical property a larger weight than another local differential geometrical property, desired certain structures and, thus, objects can be visualized stronger than other structures and, thus, other objects. For example, if the several local differential properties of the same region are different eigenvalues of a Hesse matrix of this same region, the contributions of these eigenvalues to a weighted combination of these eigenvalues which defines the visualization property, in particular, the color, of this same region, can be modified. If the several local differential properties of the same region are the weakest eigenvalue of a local Hesse matrix and a mean local shape index of this same region, the contributions of the weakest eigenvalue of the local Hesse matrix and of the mean local shape index, which define the visualization property, in particular, the color, of the same region, can be modified.

Also the property weight setting unit comprises preferentially a graphical user interface for allowing a user to set and modify the property weights. Preferentially, the graphical user interface comprises several slide controls, wherein a user can set or modify a weight of a certain local differential geometrical property by using the respective slide control.

It is further preferred that the visualization apparatus comprises a storing unit for storing the determined several local differential properties of the same region of the different regions of the image data set, wherein, if property weights are set by using the property weight setting unit, the assigning unit is adapted to retrieve from the storing unit the local differential properties of the same region and to assign a visualization property to a weighted combination of the several retrieved local differential properties in accordance with the property weights set by using the property weight setting unit.

Since, after the several local differential properties have been determined for the same region and stored in the storing unit, they don't have to be calculated again and they can be retrieved from the storing unit, the display of the visualization properties can very fast be adapted to the property weights set by using the property weight setting unit, in particular, in real-time.

For the same region of the image data set several local differential properties can be determined for several degrees of smoothing, i.e. for different resolution scales. This means for each degree of smoothing several local differential properties like several eigenvalues of a Hesse matrix, a local shape index or a mean local shape index can be determined, wherein this determination is performed for different degrees of smoothing. In order to assign a visualization property, in particular, in order to assign a color, to this same region, the different local differential properties determined for different degrees of smoothing can be combined, in particular, in accordance with the smooth degree weights and/or the property weights. The combination is preferentially a linear combination, but can also be a non-linear combination.

It is further preferred that the display unit comprises a first display region and a second display region, wherein the display unit is adapted to display the visualization properties assigned to the different regions in the first display region and to display image values of the provided image data set in the second display region, wherein the visualization apparatus comprises a selection unit for allowing a user to select a position in the first display region, wherein the display unit is adapted to indicate a corresponding position in the second display region.

This allows using the first display region which displays the visualization properties as a navigation window, wherein, if in the navigation window a certain object has been detected and selected by a user, the corresponding region is shown in the second display region, i.e. in the originally provided image data set. Thus, for example, the first display region can be used for detecting a suspicious region which could show a nodule and in the second display region this suspicious region can be investigated in more detail in the originally provided image data set.

In particular, if several regions of the image data set contribute to a position in the first display region selected by a user, in the second display region the region of the image data set is preferentially shown, which contributes most significantly to the selected position in the first display region. For example, if in the first display region a maximum intensity projection like technique is used for displaying the visualization properties of a three-dimensional image data set, a selected position in the first display region corresponds to a group of voxels, i.e. a group of regions, located along an imaginary projection ray. In this case, preferentially the voxel of this group of voxels is determined, for which the largest product of a property weight and/or a smooth degree weight and a local differential geometrical property has been determined, wherein this voxel is shown in the second display region within the originally provided image data set. If a mean local shape index has been determined as a local differential geometrical property, the voxel of the previously mentioned group of voxels is preferentially determined, for which the mean local shape index having the smallest value has been determined, wherein this voxel with the smallest mean local shape index is shown in the second display region within the originally provided image data set.

The display unit is preferentially adapted to display the visualization properties, in particular, a color image representing the determined local differential properties, superimposed with a maximum intensity projection of image gray values of the originally provided image data set. This maximum intensity projection, which can be regarded as a conventional maximum intensity projection, can be superimposed as gray values, i.e. with zero color saturation, such that an observer perceives it as a background to the displayed visualization properties, in particular, to the color image showing the determined local differential properties.

It is further preferred that the image data set providing unit is adapted to provide a first image data set of an object corresponding to a first time and a second image data set of the object corresponding to a second time, wherein the differential property determination unit is adapted to generate a registration vector field defining a registration of the first image data set and the second image data set relative to each other, and determine local differential properties of the registration vector field for different regions of the first image data set or the second image data set as the local differential properties. Since a registration vector field defining a registration of the first image data set and the second image data set relative to each other is generated and since local differential properties of the registration vector field are determined and assigned to visualization properties, which are displayed on the display unit, a change between an object at a first time shown in the first image data set and the same object at the second time shown in the second image data set can be visualized. For example, local growth characteristics of a tumor or a whole organ can be visualized.

The image data set providing unit can be adapted to provide more than two image data sets. For example, a time series of image data sets can be provided for visualizing a change of an object with time.

For each region, in particular, for each voxel, the registration preferentially determines a registration vector which connects the corresponding positions in the first image data set and the second image data set. Therefore, preferentially for a region of the first image data set and a corresponding region of the second image data set a registration vector is determined. Local differential properties of the registration vector field can therefore be determined for different regions of the first image data set and the second image data set, wherein, for example, if a local differential property has been determined for a certain region of the first image data set, this determined local differential property is also the local differential property of the corresponding region of the second image data set.

The assigning unit is preferentially adapted to assign the visualization properties to the different regions of the first image data set and/or the second image data set depending on the determined local differential properties of the registration vector field, and the display unit is preferentially adapted to display the visualization properties assigned to the first image data set and/or the second image data set.

It is further preferred that the differential property determination unit is adapted to perform an elastic registration for generating the registration vector field. This improves the quality of the generation of the registration vector field and, thus, the visualization of a change of the object between the first time and the second time.

It is further preferred that the differential property determination unit is adapted to determine eigenvalues of a local Jacobian matrix of the registration vector field as the local differential properties. Preferentially, the assigning unit is adapted to assign the visualization properties to the different regions depending on the sign of the eigenvalues. The sign of the eigenvalues can be indicative of a shrinkage or growth of the object. By visualizing the different regions depending on the sign of the eigenvalues, a shrinkage and a growth of the object can be visualized differently. This allows the visualization apparatus to direct the attention of a user to certain regions of the first image data set and/or the second image data set, in which a shrinkage or a growth of the object is shown.

It is further preferred that the assigning unit is adapted to assign a first visualization property to a region, if only the first eigenvalue of the region is the positive, a second visualization property to a region, if only the first eigenvalue and the second eigenvalue of the region are positive, a third visualization property to a region, if all eigenvalues of the region are positive, wherein the first, second and third visualization properties are different. The first, second and third visualization properties are preferentially different colors. If only the first eigenvalue is positive, a one-dimensional growth is assumed, if only the first eigenvalue and the second eigenvalue are positive, a two-dimensional growth is assumed, and if all eigenvalues are positive, a three-dimensional growth of the object is assumed. By visualizing these three options differently, the attention of a user can easily be directed to a region of the first image data set and/or the second image data set, which indicates a certain dimension of growth of the object.

In a further aspect of the present invention a visualization method for visualizing an image data set is presented, wherein the visualization method comprising the steps of:

providing the image data set, determining local differential properties for different regions of the image data set, assigning visualization properties to the different regions of the image data set depending on the determined local differential properties, wherein a visualization property defines the visualization of a region, to which the visualization property is assigned, displaying the visualization properties assigned to the different regions of the image data set.

In a further aspect of the present invention a computer program for visualizing an image data set is presented, wherein the computer program comprises program code means for causing a visualization apparatus as defined in claim 1 to carry out the steps of the visualization method as defined in claim 19, when the computer program is run on a computer controlling the visualization apparatus.

It shall be understood that the visualization apparatus of claim 1, visualization method of claim 19 and the computer program of claim 20 have similar and/or identical preferred embodiments as defined in the dependent claims.

It shall be understood that a preferred embodiment of the invention can also be any combination of the dependent claims with the respective independent claim.

BRIEF DESCRIPTION OF THE DRAWINGS

These and other aspects of the invention will be apparent from and elucidated with reference to the embodiment(s) described hereinafter. In the following drawings.

DETAILED DESCRIPTION OF EMBODIMENTS

Figure 1:
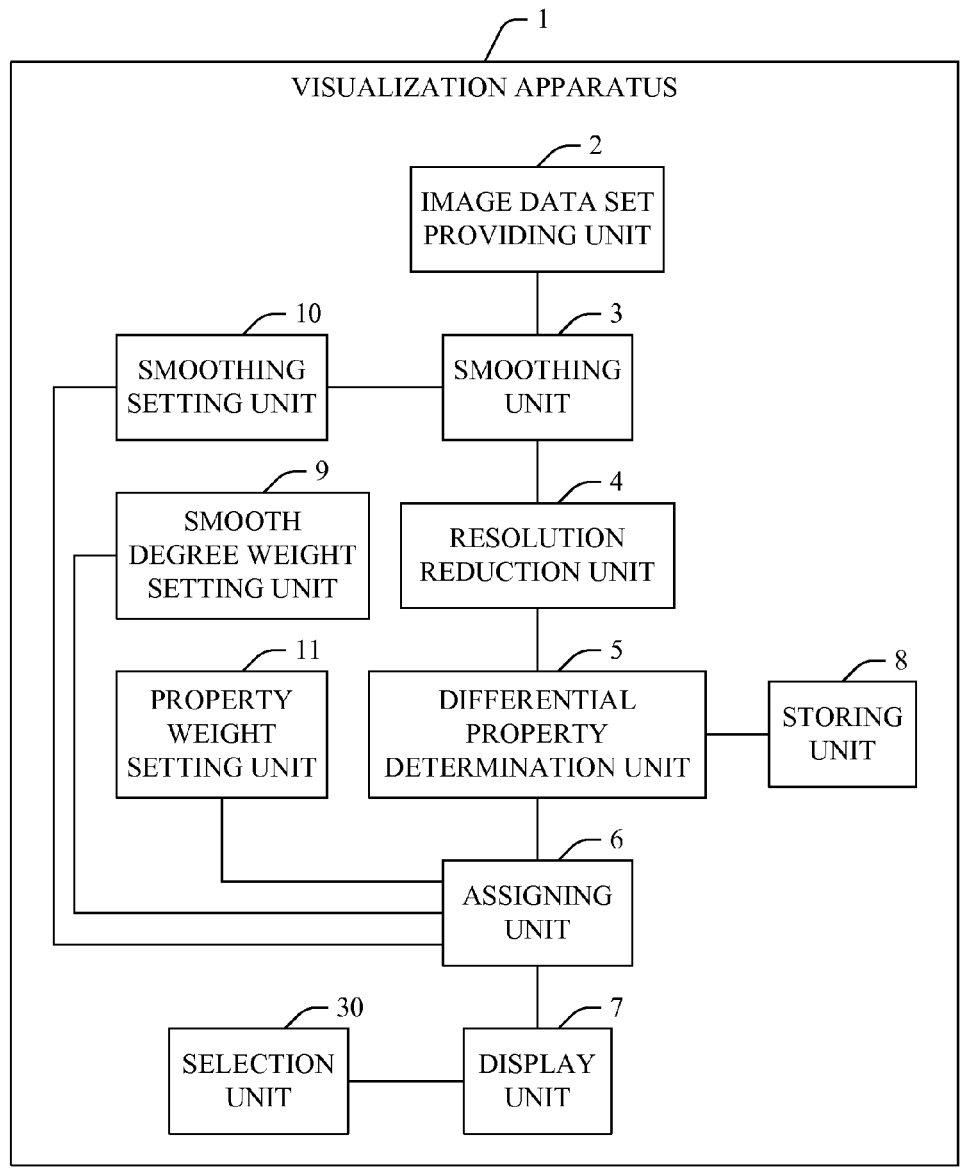
FIG. 1 shows schematically and exemplarily an embodiment of a visualization apparatus for visualizing an image data set.

FIG. 1 shows schematically and exemplarily a visualization apparatus for visualizing an image data set. The visualization apparatus 1 comprises an image data set providing unit 2 for providing the image data set and a smoothing unit 3 for smoothing the image data set in accordance with a degree of smoothing. The degree of smoothing is preferentially set by a user by using a smoothing setting unit 10. The visualization apparatus 1 further comprises a resolution reduction unit 4 for reducing the resolution of the smoothed image data set.

The visualization apparatus 1 further comprises a differential property determination unit 5 for determining local differential properties for different regions of the image data set and an assigning unit 6 for assigning visualization properties to the different regions of the image data set depending on the determined local differential properties, wherein a visualization property defines the visualization of a region, to which the visualization property is assigned. The visualization properties assigned to the different regions of the image data set are displayed by using a display unit 7.

The image data set is preferentially an image data set of a computed tomography imaging system, a magnetic resonance imaging system, a nuclear imaging system or an ultrasound imaging system. In this embodiment, the image data set is an image data set of a computed tomography imaging system.

Figure 2:
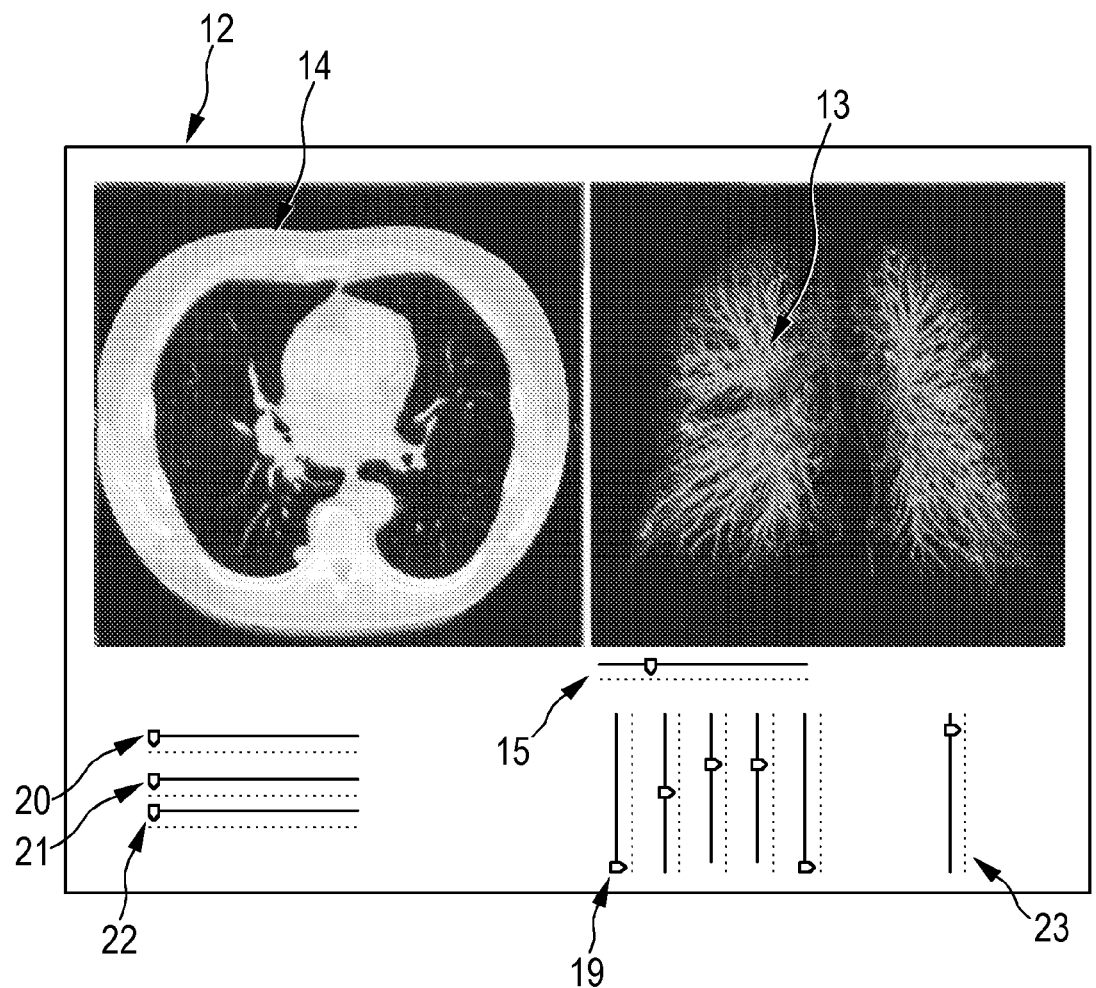
FIG. 2 shows schematically and exemplarily a display of the visualization apparatus showing a lung in a low degree of smoothing.

FIG. 2 shows schematically and exemplarily a display 12 of the display unit 7, wherein in a first display region 13 the visualization properties assigned to the different regions are displayed and wherein in a second display region 14 image values of the provided image data set are displayed, in particular, in this embodiment, in the second region 14 an image of a thorax of a person is shown.

The image data set providing unit 2 is a storing unit, in which the image data set is stored and from which the image data set can be retrieved for providing the image data set. In another embodiment, the image data set providing unit can also be an imaging system which generates the image data set like the imaging systems mentioned above. The image data set providing unit 2 can also be a transfer unit allowing transferring the image data set to the smoothing unit 3 for providing the image data set. For example, the image data set providing unit 2 can be a wired or wireless data transmission unit or an optical data transmission unit.

The smoothing setting unit 10 comprises a graphical user interface allowing a user to set and modify the degree of smoothing. In this embodiment, the graphical user interface is a slide control 15 shown on the display 12 of the display unit 7. By sliding the slide control 15, for example, by using a computer mouse, the degree of smoothing can be modified. The degree of smoothing can also be regarded as resolution scale, i.e. by sliding the slide control 15 the resolution scale can be modified.

The visibility of certain objects or structures can be increased and the visibility of other objects or structures can be decreased by modifying the degree of smoothing, i.e. the resolution scale. For example, if the degree of smoothing is large, the visibility of small and fine objects or structures can be decreased, whereas the visibility of coarser objects or structures can be increased. Correspondingly, small and fine structures can become more and more visible, if the degree of smoothing is decreased. Thus, the degree of smoothing can be adapted to the desired object or structure, which should be visualized, in particular, detected, within the image data set.

For example, a user can slide the slide control 15 such that the user can detect a desired object or structure. If the image data set is a medical image data set and the user wants to detect regions being suspicious of indicating cancer, the user can slide the slide control 15 such that a region becomes visible, which is suspicious for indicating cancer. For example, in the situation shown in FIG. 2 the slide control is relatively close to the left side which means that a relatively low degree of smoothing, i.e. a fine resolution scale, has been chosen by the user. The displayed visualization properties assigned to the different regions of the image data set shown in the first display region 13 show fine structures like thin vessels and fine tumors. In the situation shown in FIG. 3 the slide control 15 has been moved a little to the right side by the user, in order to increase the degree of smoothing. Thus, in FIG. 3 a coarser resolution scale has been chosen by the user and thicker vessels and thicker tumors become visible.

The smoothing unit 3 is adapted to apply a Gaussian filter to the image data set, which corresponds to the degree of smoothing set by the user by using the smoothing setting unit 10 comprising the slide control 15, for smoothing the image data set. Different degrees of smoothing, i.e. different resolution scales, are preferentially achieved by applying different Gaussian filters having different filter widths to the image data set.

In this embodiment, the visualization apparatus 1 is adapted such that the image data set is smoothed, if required in view of the desired degree of smoothing, before the local differential properties are determined.

The resolution of the smoothed image data set is preferentially reduced by the resolution reduction unit 4 by reducing the number of image elements, which are, in this embodiment, voxels. This reduction of the resolution is also preferentially performed before determining the local differential properties.

The resolution reduction unit 4 is adapted to reduce the resolution of the smoothed image data set in accordance with the degree of smoothing such that all features shown in the smoothed image data set are maintained under consideration of the Nyquist criterion. Thus, the number of voxels of the smoothed image data set is reduced, without removing structural information from the image data set.

The differential property determination unit 5 is adapted to determine different local differential properties for the same region, i.e. in this embodiment for the same voxel, of the image data set, which is in this embodiment a three-dimensional image data set. Thus, for a single voxel a number of local differential properties are determined. In particular, for all voxels of the image data set a number of local differential properties are determined.

The term "local" indicates that not a global single differential geometric property is determined for the complete image data set, but that for a region of the image data set, in particular, for a voxel of the image data set, a differential geometrical property is determined.

In this embodiment, the differential property determination unit 5 is adapted to determine three eigenvalues of a Hesse matrix as local differential properties of a voxel. Preferentially, the differential property determination unit 5 determines for each voxel of the image data set three eigenvalues of the Hesse matrix.

The assigning unit 6 is adapted to assign colors as visualization properties to the different regions, i.e. in this embodiment to different voxels, of the image data set depending on the determined local differential properties, i.e. in this embodiment depending on the determined eigenvalues of the Hesse matrix.

In this embodiment, the color, which is assigned to a certain voxel, is preferentially defined by coordinates of the RGB system. Thus, the color assigned to a voxel is preferentially defined by a R value, a G value and a B value. In other embodiments, the color can be represented in another color coordinate system, for example, in the HSV system. Furthermore, instead of or in addition to the color, another visualization property can be assigned to the voxels of the image data set, for example, different degrees of transparency can be assigned to the voxels.

The assigning unit 6 is adapted to combine the three eigenvalues of the Hesse matrix, which have been determined for a voxel, and to assign a color to the resulting combination. For example, the first eigenvalue of the Hesse matrix determines the R value, the second eigenvalue of the Hesse matrix determines the G value and the third eigenvalue of the Hesse matrix determines the B value. If this is performed for each voxel of the image data set, to each voxel a color is assigned depending on the eigenvalues of the Hesse matrix, which have been determined for the respective voxel. Such an assignment of a color to a voxel depending on the three eigenvalues of the Hesse matrix can be described by following equations:

$$C^R = C_0^R \lambda_0 + C_1^R \lambda_1 + C_2^R \lambda_2$$

$$C^G = C_0^G \lambda_0 + C_1^G \lambda_1 + C_2^G \lambda_2,$$

$$C^B = C_0^B \lambda_0 + C_1^B \lambda_1 + C_2^B \lambda_2 \qquad (1)$$

wherein $C=\{C^R, C^G, C^B\}$ is the resulting color, consisting of a red, green, and blue component, $\lambda_0, \lambda_1, \lambda_2$ are the three eigenvalues of the Hesse matrix, $C_0=\{C_0^R, C_0^G, C_0^B\}$, $C_1=\{C_1^R, C_1^G, C_1^B\}$, $C_2=\{C_2^R, C_2^G, C_2^B\}$ are three predefined colors, each consisting of a red, a green, and a blue component, associated with the eigenvalues. Alternatively, the three eigenvalues $\lambda_0, \lambda_1, \lambda_2$ can be replaced by features derived from the eigenvalues.

The visualization apparatus 1 further comprises a selection unit 15 for allowing a user to select a position in the first display region 13, wherein the display unit 7 is adapted to indicate a corresponding position in the second display region 14.

The first display region 13 which displays the visualization properties, i.e. in this embodiment the colors assigned to the different voxels, is used as a navigation window, wherein, if in the navigation window 13 a certain object has been detected and selected by a user, the corresponding region is shown in the second display region 14, i.e. in the originally provided image data set. Thus, the first display region 13 is preferentially used as a navigation window for detecting a suspicious region which could show, for example, a nodule, and in the second display region 14 the suspicious region can be investigated in more detail in the originally provided image data set.

In the first region 13 the color-coded voxels are rendered in a desired viewing geometry such as coronal/sagittal for producing an overview image in the first display region 13, i.e. in the navigation window 13. The color-coded voxels are preferentially rendered using a maximum intensity projection-like technique. However, also other surface or volume rendering techniques can be used for rendering the color-coded voxels. During performing the maximum intensity projection-like technique the color of a voxel is preferentially shown in the first display region 13, which corresponds to the largest eigenvalue of the Hesse matrix of the voxels along an imaginary projection ray which is used for performing the maximum intensity projection-like technique. In general, a maximum intensity projection-like technique is used for mapping a three-dimensional data set on a two-dimensional display for showing the three-dimensional data set. The imaginary projection rays are projected through the three-dimensional image data set onto the two-dimensional display, wherein from the voxels arranged along the respective imaginary projection ray a voxel is selected fulfilling a predefined selection criterion, for example, having the largest intensity. In this embodiment, the voxel is selected having the largest eigenvalue of the Hesse matrix. In other embodiments another selection criterion can be used for performing the maximum intensity projection-like technique, for example, the color having the largest intensity in a HSV coordinate system can be displayed on the two-dimensional display unit.

Since in this embodiment a maximum intensity projection-like technique is used for displaying the colors assigned to the voxels of the three-dimensional image data set in the first display region 13, if the user selects a certain position in the first display region 13, the position of the voxel being selected by the maximum intensity projection-like technique is shown in the second display region 14. Several voxels of the image data set could therefore contribute to a position in the first display region 13 selected by the user, wherein in the second display region 14 the voxel of the image data set is preferentially shown, which contributes most significantly to the selected position in the first display region 13, i.e. in this embodiment which fulfils the selection criterion used for performing the maximum intensity projection-like technique.

For example, by using the selection unit 30 being preferentially a graphical user interface allowing to click into the first display region 13, i.e. into the navigation window 13, a position can be selected in the first display region 13, wherein, for example, by cross-hair, the corresponding three-dimensional position, which contributes most significantly to the position of the color-coded overview image in the first display region 13, is indicated in the originally provided image data set which is shown in the second display region 2, for example, in an orthoviewer.

Figure 3:
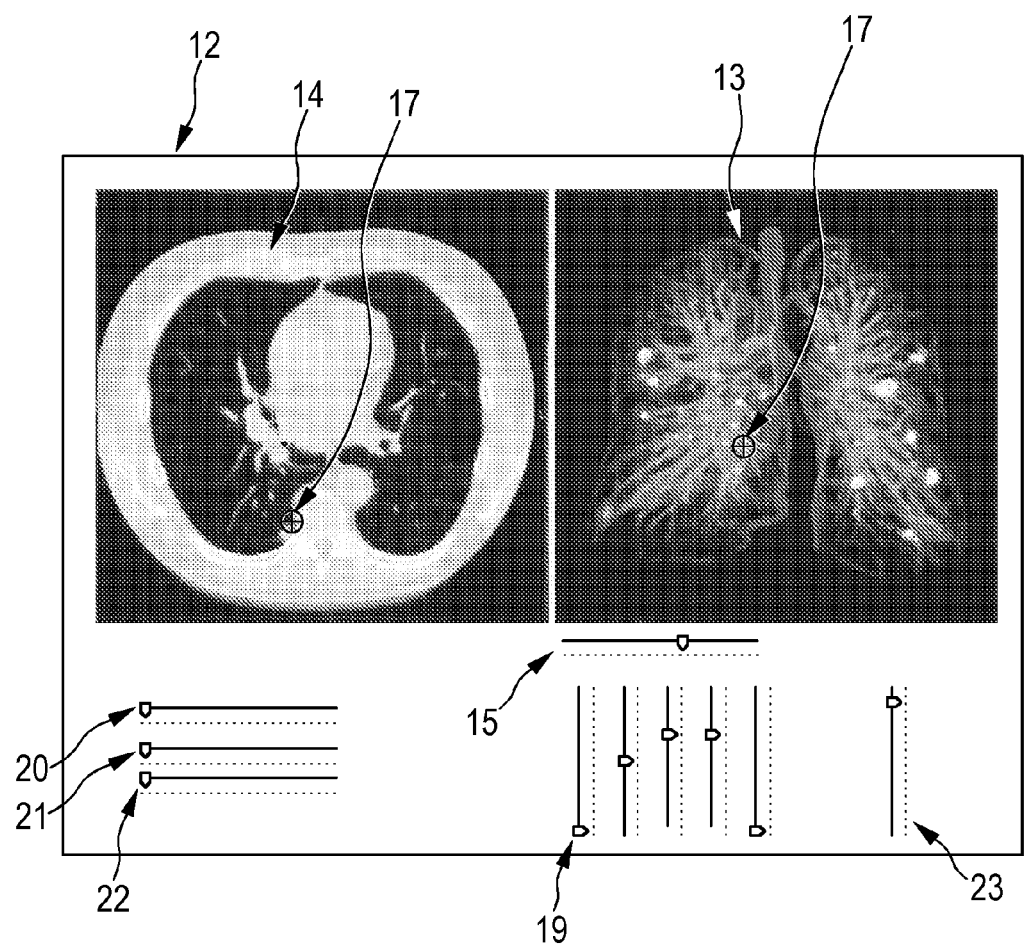
FIG. 3 shows schematically and exemplarily the display of the visualization apparatus displaying the lung with a larger degree of smoothing.

FIG. 3 shows schematically and exemplarily a situation in which the user has selected the position indicated by the cross 16 in the first display region 13, wherein in the second display region 14 the corresponding position is indicated by a crosshair 17 within the originally provided image data set. Instead of a crosshair another marking element can be used for marking the corresponding position in the second display region 14.

The display unit can be adapted for displaying the visualization properties assigned to the different regions of the image data set, i.e. in this embodiment to display the colors assigned to the different voxels of the image data set, in the first display region 13, which shows a navigator image, by using cut-planes such that only certain objection parts like organ parts are rendered, for example, only the left or right lung, and less object parts are obstructed by projection.

The visualization apparatus 1 further comprises a storing unit 8, wherein the smoothing unit 3 is adapted to smooth the image data set several times in accordance with different degrees of smoothing for generating several differently smoothed image data sets. The resolution reduction unit 4 is preferentially adapted to reduce the resolution of the differently smoothed image data sets in accordance with the respective degree of smoothing, in particular, if the respective degree of smoothing allows reducing the resolution without removing structural information from the image data set. The differential property determination unit 5 is preferentially adapted to determine several local differential properties of the different regions for the differently smoothed image data set, i.e. in this embodiment for each voxel of the image data set and for each degree of smoothing, i.e. for each resolution scale, three eigenvalues of the Hesse matrix are determined. The storing unit 8 is adapted to store the several local differential properties of the different regions determined for the differently smoothed image data set, i.e. in this embodiment the storing unit 8 is adapted to store the three eigenvalues of the Hesse matrix which have been determined for each voxel and for each degree of smoothing. This is performed for a certain number of degrees of smoothing, which can be predefined or which can be selected by a user.

If a certain degree of smoothing is selected by a user by using the smoothing setting unit 10, the assigning unit 6 retrieves from the storing unit 8 the local differential properties, i.e. in this embodiment the eigenvalues of the Hesse matrix, which have been determined for a smoothed image data set which corresponds to the selected degree of smoothing, and the assigning unit 6 assigns the visualization properties to the different regions of the image data set depending on the retrieved local differential properties, i.e. in this embodiment the assigning unit 6 assigns the colors to the voxels of the image data set depending on the retrieved three eigenvalues of the Hesse matrix determined for the respective voxel and the selected degree of smoothing. In another embodiment, instead of or in addition to storing the local differential properties in the storing unit 8, which have been determined for different voxels and for different degrees of smoothing, the resulting visualization properties, i.e. in this embodiment the resulting colors, assigned to the different regions, i.e. in this embodiment to the different voxels, can be stored in the storing unit 8.

The storing unit 8 is preferentially adapted to store the pre-computed values in memories or files.

If a certain degree of smoothing is set by a user by using the smoothing setting unit 10, for which the local differential properties have not been determined, corresponding local differential properties are preferentially calculated by interpolation using pre-computed local differential properties, which have been determined for degrees of smoothing being close to the degree of smoothing set by using the smoothing setting unit 10.

Since after the local differential properties of the different regions for the differently smoothed image data sets have been stored in the storing unit 8, they can be retrieved without the need of calculating them again, the display of the visualization properties assigned to the different regions can be very fast adapted to a degree of smoothing set by a user by using the smoothing setting unit 10, in particular, in real-time, even if the display unit 7 only has a limited computational capacity.

The local property determination unit 5 comprises preferentially graphical processing units (GPUs) for determining the local differential properties, because the calculation of these properties requires only very basic and local mathematical operations, which are ideally suited to be carried out on GPUs.

The storing unit 8 is preferentially adapted to store the determined local differential properties of a region of the image data set, only if the determined local differential properties are larger than a threshold value, which is chosen such that neglecting local differential properties below the threshold would influence the display of the visualization properties only negligible. Preferentially, local differential properties determined for a region of the image data set and for a certain degree of smoothing are only neglected, i.e. not stored in the storing unit, if all local differential properties determined for this region of the image data set and for this certain degree of smoothing are below the threshold. In this embodiment, eigenvalues of a Hesse matrix determined for a certain voxel and a certain degree of smoothing are only stored in the storing unit, if these eigenvalues are all above the threshold. The threshold is, for example, 5% of the largest determined local differential geometrical property or smaller, 3% of the largest determined local differential property or smaller, or 1% of the largest determined local differential geometrical property or smaller. Thus, by storing only salient voxels, i.e. a certain quantity of voxels showing high filter answers, if the visualization properties are determined by applying a corresponding filter to the smoothed image data set, while neglecting voxels with low filter answers which would influence the rendering only negligibly, the memory or file-space consumption of the pre-computed values can be significantly reduced. It should be noted that the regions of the image data set, for which local differential properties are not stored, may be different ones for different degrees of smoothing, i.e. for different levels of the scale space.

Instead of pre-computation of the local differential properties for different degrees of smoothing, the differential property determination unit 5 can also be adapted to perform the computation in real-time on a dedicated co-processor, multiprocessor-computer, distributed computers, or a hardware graphics card like a GPU, preferentially, by performing the required operations needed for computing the local differential properties in parallel.

The assigning unit 6 can be adapted to assign a visualization property, i.e. in this embodiment a color, to a weighted combination of the several properties of the same region, which have been determined for different degrees of smoothing. In this embodiment, the assigning unit can weightedly combine the eigenvalues of the Hesse matrix, which have been determined for different degrees of smoothing, for the same voxel, in order to assign a color to this same voxel by assigning a color to the respective weighted combination. The weights for this weighted combination can be set by a user by using a smooth degree weight setting unit 9. The smooth degree weight setting unit 9 comprises a graphical user interface allowing a user to set the smooth degree weights. This graphical user interface comprises, in this embodiment, several slide controls 18 for modifying the weights of the contributions of the local differential properties which have been determined for different degrees of smoothing. The slide controls 18 are exemplarily and schematically shown in FIG. 4.

For assigning a color to a voxel, i.e. for assigning a color to a weighted combination of eigenvalues of a Hesse matrix, which have been determined for different degrees of smoothing, i.e. for different resolution scales, preferentially following equations are used:

$$C^R = \Sigma_s \Sigma_i C_i^R w_s \lambda_{i,s}$$

$$C^G = \Sigma_s \Sigma_i C_i^G w_s \lambda_{i,s}$$

$$C^B = \Sigma_s \Sigma_i C_i^B w_s \lambda_{i,s} \quad (2)$$

wherein the summation runs over the different degrees of smoothing indicated by s, i.e. over different resolution scales, and the eigenvalues indicated by i, $C=\{C^R, C^G, C^B\}$ is the resulting color, consisting of a red, green, and blue component, $w_s$ are the smooth degree weights for the degrees of smoothing s, $\lambda_{i,s}$ is the $i^{th}$ eigenvalue of the Hesse matrix computed on degree of smoothing s, $C_i=\{C_i^R, C_i^G, C_i^B\}$ is the color (consisting of a red, a green and a blue component) associated with the eigenvalue. Alternatively, the eigenvalues $\lambda_i$ can be replaced by features derived from the eigenvalues.

The smooth degree weight setting unit 9 allows the user to smoothly vary the contribution weights of the different degrees of smoothing, i.e. of the different resolution scales, wherein the display of the visualization properties in the first display region 13 is refreshed in accordance with the smooth degree weights set by the smooth degree weight setting unit 9.

The storing unit 8 is preferentially further adapted to store several local differential properties of the same region, which have been determined for the different degrees of smoothing of the image data set. Thus, the storing unit is preferentially adapted to store the eigenvalues of the Hesse matrix, which have been determined for each voxel and for different degrees of smoothing. If smooth degree weights are set by using the smooth degree weight setting unit 9, the assigning unit 6 is preferentially adapted to retrieve from the storing unit 8 the several local differential properties of the same region and to assign the visualization property to a weighted combination of the several retrieved local differential properties in accordance with the smooth degree weights set by using the smooth degree weight setting unit 9. Thus, in this embodiment, if the smooth degree weights are set by using the slide control 18 of the smooth degree weight setting unit 9, the assigning unit retrieves the eigenvalues of the Hesse matrix for each voxel, which correspond to the set smooth degree weights, combines the several retrieved eigenvalues of the Hesse matrix in accordance with the smooth degree weights for each voxel and assigns a color to the resulting weighted combination of each voxel, in order to assign a color to each voxel of the image data set.

Since, after the several local differential properties of the same region have been determined for the different degrees of smoothing and after they have been stored in the storing unit 8, it is not necessary to calculate them again and since they have just to be retrieved from the storing unit 8, the display of the visualization properties can be very fast be adapted to the smooth degree weights set by a user by using the smooth degree weight setting unit, in particular, in real-time. Thus, the image shown in the first display region 13, i.e. the image shown in the navigation window, can be refreshed, in particular, in real-time, while the user modifies the smooth degree weights by using the slide controls 18 of the smooth degree weight setting unit 9.

As already mentioned above, the differential property determination unit 5 is adapted to determine several local differential properties for the same region of the different regions of the image data set and for the same degree of smoothing. In this embodiment, for each voxel of the image data set and for each degree of smoothing three eigenvalues of the Hesse matrix are determined. The assigning unit 6 can be adapted to assign a visualization property to a weighted combination of the several properties of the same region which have been determined for the same degree of smoothing. Thus, in this embodiment, the three eigenvalues of a voxel, which have been determined for the same degree of smoothing, are weightedly combined, wherein the resulting combination is used for assigning a color to the respective voxel. This assignment is preferentially performed in accordance with following equations:

$$C^R = \Sigma_i C_i^R v_i \lambda_i$$

$$C^G = \Sigma_i C_i^G v_i \lambda_i$$

$$C^B = \Sigma_i C_i^B v_i \lambda_i \quad (3)$$

wherein $\lambda_i$ denotes the $i^{th}$ eigenvalue of the Hesse matrix and $v_i$ denotes the property weight of the $i^{th}$ eigenvalue.

The visualization apparatus 1 can further comprise a property weight setting unit 11 for allowing a user to set property weights for the weighted combination of the several local differential properties of the same region of the image data set, which have been determined for the same degree of smoothing. In this embodiment, the property weight setting unit 11 allows a user to set property weights for the weighted combination of the three eigenvalues of the Hesse matrix of the same voxel of the image date set, which have been determined for the same degree of smoothing.

Also the property weight setting unit 11 comprises a graphical user interface for allowing a user to set and modify the property weights. The graphical user interface comprises several slide controls 19, wherein a user can set or modify a weight of a certain eigenvalue of the Hesse matrix by using the respective slide control. In this embodiment, three slide controls are used for modifying the property weights of the first, second and third eigenvalue of the Hesse matrix. The two further slide controls are used for modifying property weights of features derived from the eigenvalues. These features are, for example, the positive amount of the second eigenvalue, the positive amount of the third eigenvalue, the negative amount of the second eigenvalue, the negative amount of the third eigenvalue, or the negative amount of the second eigenvalue minus the absolute magnitude of the third eigenvalue. More than the five slide controls can be present in order to allow modifying the property weights for these different features. Furthermore, the slide controls can be used for modifying the property weights of these features only, wherein, in this case, the eigenvalues in, for example, equations (3) are replaced by the respective features derived from the eigenvalues. Thus, not only the eigenvalues can be regarded as local differential properties, but also the features derived from the eigenvalues.

Preferentially, the first eigenvalue is the eigenvalue having the largest absolute magnitude, the second eigenvalue is the eigenvalue having the second largest absolute magnitude, and the third eigenvalue is the eigenvalue having the third largest absolute magnitude. Moreover, the positive amount of an eigenvalue is zero, if the eigenvalue is negative, and the positive amount of the eigenvalue is the absolute magnitude of the eigenvalue, if the eigenvalue is positive. The negative amount of an eigenvalue is the absolute magnitude of the eigenvalue, if the eigenvalue is negative, and the negative amount of the eigenvalue is zero, if the eigenvalue is positive.

Figure 5:
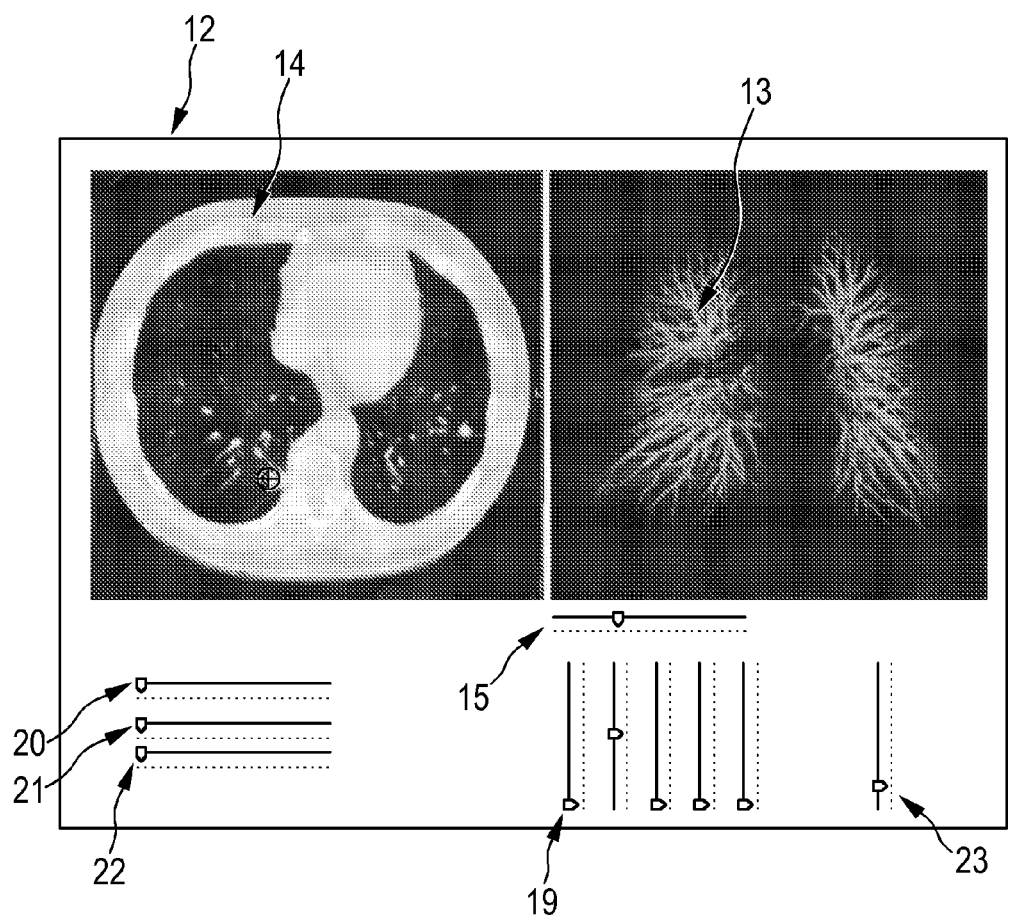
FIG. 5 shows a further display of a visualization apparatus for visualizing an image data set.
Figure 6:
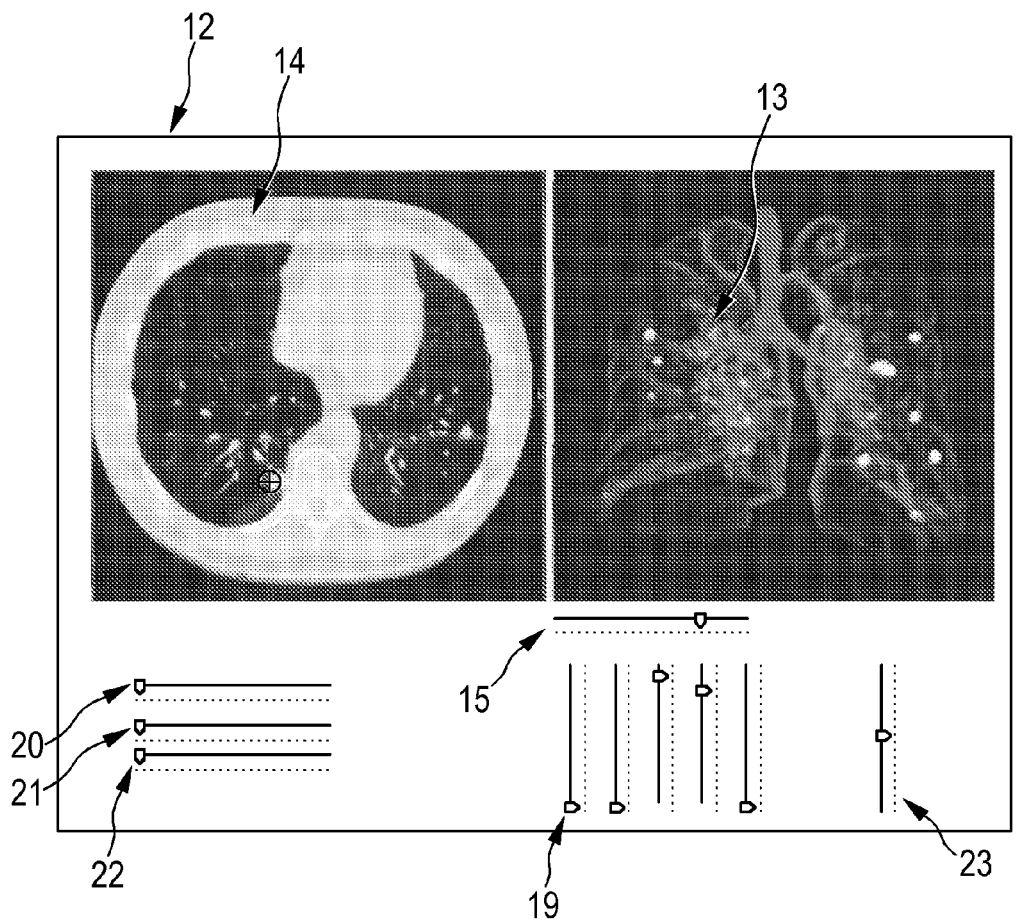
FIG. 6 shows schematically and exemplarily the display shown in FIG. 5, wherein the property weights have been modified in comparison to FIG. 5.

By using the slide controls 19 the user can smoothly vary the contribution of weights of the individual local differential properties, wherein after the contribution weights have been varied, the display of the visualization properties, i.e. in this embodiment the display of the colors, in the first display region 13, i.e. in the navigation window, is refreshed, in particular, in real-time. Different local differential properties, which have been determined for the same region and for the same degree of smoothing, can be indicative of different kinds of structures and, thus, of different objects. Thus, by giving a certain local differential geometrical property, a larger weight than another local differential geometrical property, desired certain structures and, thus, objects can be visualized stronger than other structures and, thus, other objects. For example, in FIGS. 2 and 3 the slide controls 19 are located at the same position, i.e. the same property weights are chosen. However, in FIG. 5 the slide controls 19 are set such that the rendering in the first display region 13 is only based on the second largest negative eigenvalue of the Hesse matrix of the respective voxel. With this setting almost only lung vessels are displayed in the first display region 13. In FIG. 6 the slide controls 19 have been set such that rendering in the first display region 13 is performed depending on the second largest positive eigenvalue of the Hesse matrix of the respective voxel and based on the third largest negative eigenvalue of the Hesse matrix of the respective voxel. The resulting rendered image shown in the first display region 13 of FIG. 6 shows the airways and some rib cage structure and nodular tumors.

Since the storing unit 8 is preferentially adapted to store the determined several local differential properties of the same region of the different regions of the image data set, which have been determined for the same degree of smoothing, if property weights are set by using the property weight setting unit 11, the assigning unit 6 preferentially retrieves from the storing unit 8 the local differential properties of the same region and assigns a visualization property to a weighted combination of the several retrieved local differential properties in accordance with the property weights set by using the property weight setting unit 11. This allows also in this case that the display of the visualization properties can be very fast adapted to the property weights set by using the property weight setting unit 11, in particular, in real-time.

In this embodiment, for the same region of the image data set several local differential properties are determined for several degrees of smoothing, i.e. for different resolution scales. Thus, for each voxel of the image data set and for each degree of smoothing three eigenvalues of the Hesse matrix are stored in the storing unit 8. The embodiment shown in FIGS. 2, 3, 5 and 6 allow a user to choose a desired degree of smoothing by using the slide control 15 of the smooth setting unit 10 and to choose desired property weights by using the slide controls 19 of the property weight setting unit 11. Depending on these values set by the user, the eigenvalues of a voxel are combined and a color is assigned to this combination, in particular, in accordance with equations (3).

Figure 4:
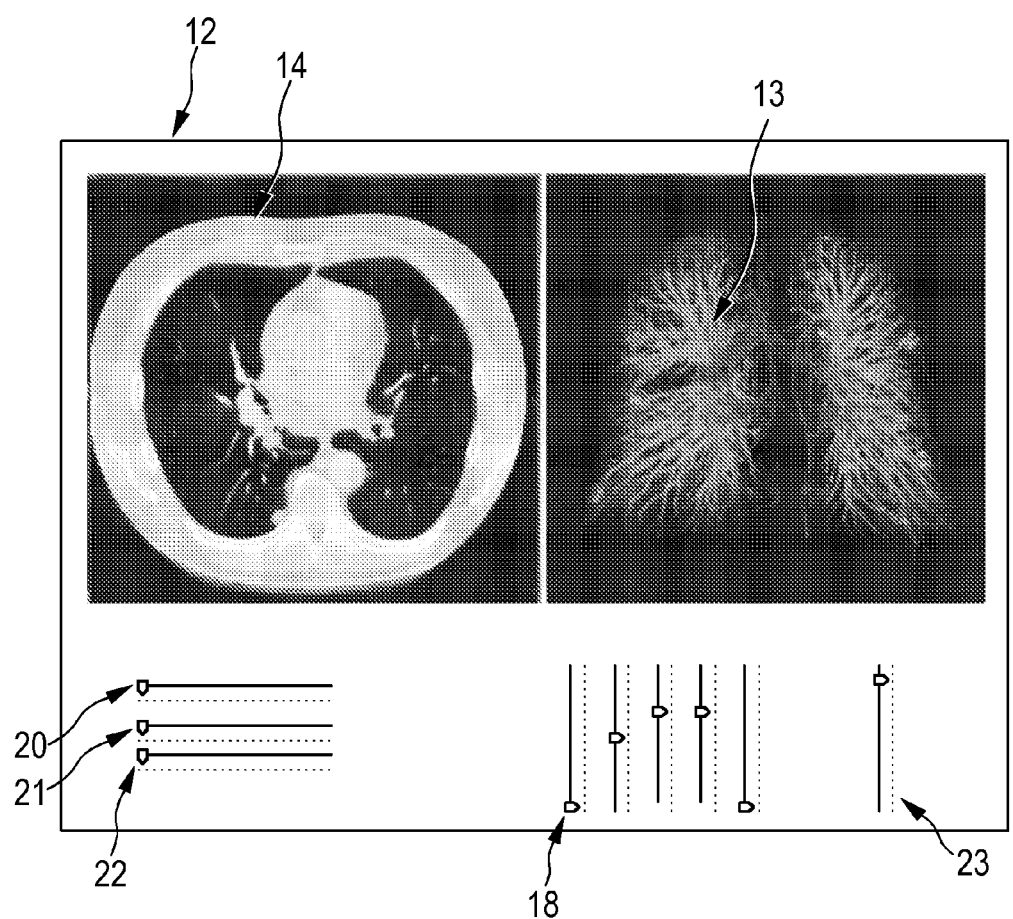
FIG. 4 shows schematically and exemplarily another display of a visualization apparatus for visualizing an image data set.

In the embodiment shown in FIG. 4, the user can choose desired smooth degree weights by using the slide controls 18 of the smooth degree weight setting unit 9, wherein the assigning unit 6 combines the eigenvalues of the Hesse matrix, which have been determined for the same voxel and for different degrees of smoothing, in accordance with the chosen smooth degree weights and assigns a color to the resulting combination, in particular, in accordance with equations (2).

In a further embodiment, the display apparatus comprises the property weight setting unit and the smooth degree weight setting unit, i.e. a user can choose different property weights for weighting different local differential properties of the same voxel, which have been determined for the same degree of smoothing, differently, and the user can choose smooth degree weights for weighting the same local differential geometrical property, which has been determined for the same voxel and for different degrees of smoothing, differently. If selected property weights and selected smooth degree weights are considered, the assigning unit is preferentially adapted to assign a color to a corresponding combination of the eigenvalues of the Hesse Matrix determined for a voxel in accordance with following equations:

$$C^R = \Sigma_s \Sigma_i C_i^R v_i w_s \lambda_{i,s}$$

$$C^G = \Sigma_s \Sigma_i C_i^G v_i w_s \lambda_{i,s}$$

$$C^B = \Sigma_s \Sigma_i C_i^B v_i w_s \lambda_{i,s} \quad (4)$$

In FIGS. 2 to 6 a color slide control 20 is shown for modifying the color of the image data set shown in the second display region 14, a level slide control 21 is shown for modifying the level of the display shown in the second display region 14 and a window slide control 22 is shown for modifying the window of the second display region 14. Furthermore, a brightness slide control 23 is shown for modifying the brightness of the first display region 13.

Figure 7:
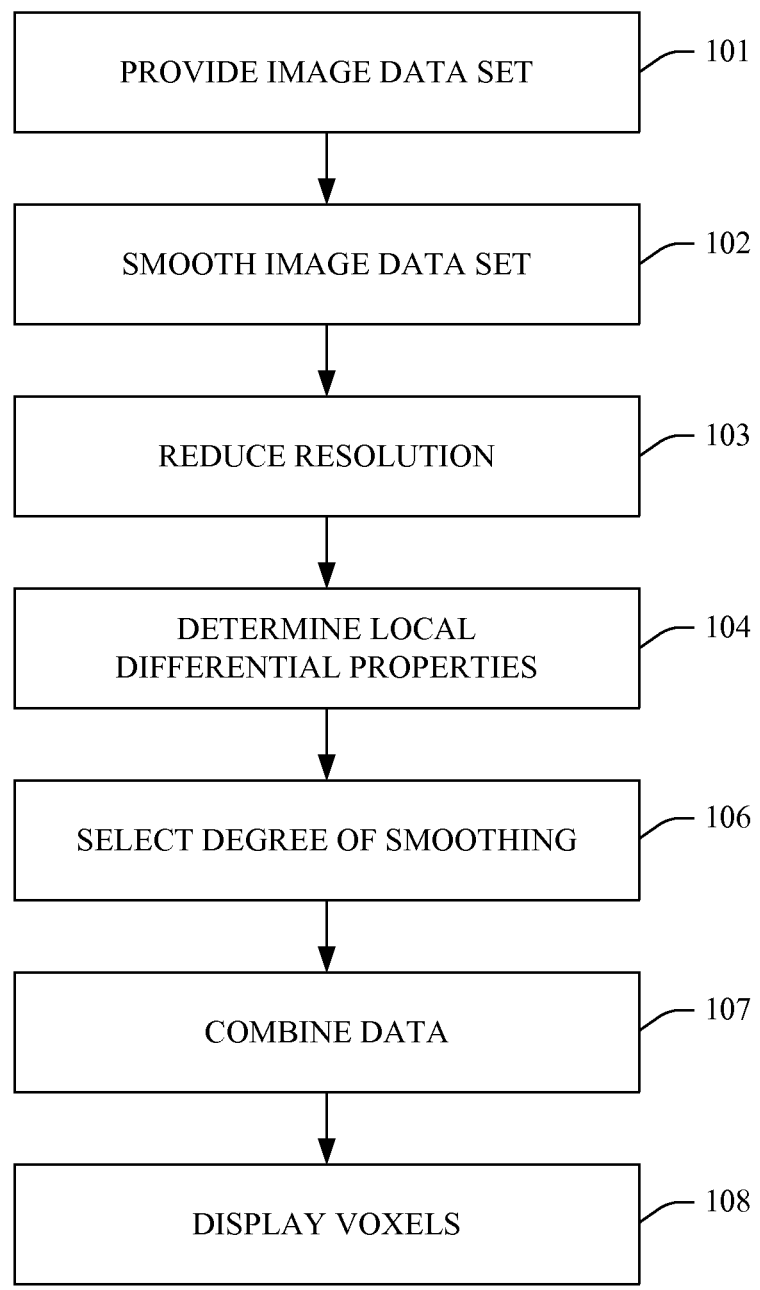
FIG. 7 shows a flowchart exemplarily illustrating an embodiment of a visualization method for visualizing an image data set.

In the following a visualization method for visualizing an image data set will be exemplarily described with reference to a flow chart shown in FIG. 7.

In step 101, an image data set is provided by the image data set providing unit 2. Preferentially, a medical image data set is provided which shows an organ like a lung. In step 102, the image data set is smoothed in accordance with different degrees of smoothing by the smoothing unit 3, and in step 103 the resolution of the smoothed image data set is reduced in accordance with the respective degree of smoothing such that structural information is not removed from the smoothed image data sets. The reduction of the resolution is performed by the resolution reduction unit 4.

In step 104, local differential properties, in this embodiment, three eigenvalues of a Hesse matrix, are determined for different regions of the image data set, in this embodiment, for different voxels of the image data set. This means, in this embodiment for each voxel of the image data set and for each smoothed image data set, i.e. for each degree of smoothing, three eigenvalues of the Hesse matrix are determined. This determination is performed by the differential property determination unit 5.

In step 106, a user can select a desired degree of smoothing and preferentially desired property weights for weighting the different local differential properties, which have been determined for a same voxel and for a same degree of smoothing, differently, and in step 107, the assigning unit 6 combines for each region of the image data set the determined local differential properties in accordance with the property weights and degree of smoothing selected by the user. Moreover, the assigning unit 6 assigns a color to this combination, wherein the colors assigned to the regions, i.e. the colors assigned to the voxels of the image data set, are displayed in the first display region 13 by the display unit in step 108.

The visualization method can be adapted to the steps performed by the units of the visualization apparatus, which are described above and in the claims. The visualization method comprises preferentially at least the steps of providing an image data set, determining local differential properties for different regions of the image data set, assigning visualization properties to the different regions of the image data set depending on the determined local differential properties, and displaying the visualization properties assigned to the different regions of the image data set.

The visualization apparatus is preferentially adapted to allow the object shown in the first display region 13 to be rotated such that it can be inspected from different directions. In particular if pre-computed local differential properties, which are stored in the storing unit, are used for assigning the visualization properties to the image regions, the rotation can be performed in real-time.

The invention can be used as a part of scanner consoles, image work stations, for example, extended Brilliance Workspace, ViewForum, and PACS workstations like iSite. The display apparatus can provide a quick overview over a three-dimensional volume image data set such as a computed tomography image data set, for single organs like the lung, body parts like the thorax, or over whole body images. The color-coding of local differential properties on different resolution scales allows an intuitive visual recognition of various organ parts like vessels, fissures or airways as well as anomalies such as tumors, without the use of explicit CAD tools or segmentation algorithms. Any point of interest in the rendering in the first display region 13, i.e. in the navigation window, can be clicked on and the user will be referred to the corresponding position in the original image data set, which is shown in the second display region 14, for further visual inspection. Due to pre-computation of the local differential properties, the rendering can be interactively rotated and the resolution scale contribution can be changed in real-time.

Since tumors are outstanding visually in the first display region 13 but not explicitly marked, the complicated regulatory approval common for CAD tools is generally not necessary. Furthermore, since the display apparatus preferentially does not comprise an explicit segmentation algorithm, it is generally not prone to the normal misclassification problems which come along with binary classification decisions. Furthermore, since the visualization in the first display region 13 relies on local differential geometrical operators, it is not or less sensitive to absolute threshold or intensity values such as Hounsfield values. Moreover, noise is not problematic as becomes automatically less important in larger degrees of smoothing, i.e. in higher levels of the resolution scale space. By modifying the degree of smoothing, the user can interactively change towards the noise level the user finds acceptable. Furthermore, since the calculations performed by the display apparatus preferentially do not comprise a segmentation, in particular, with global structures and a high degree of random memory access, the calculations needed for visualization the image data set are highly parallelizable for multi-core processors.

Although in the above described embodiments colors have been assigned with respect to a RGB color coordinate system, instead of the RGB color coordinate system also another color coordinate system can be used, for example, the HSV system. Furthermore, instead of assigning a color another visualization property can be assigned to the voxels, for example, a degree of transparency.

Although in the described embodiments the image data set is a three-dimensional image data set, the display apparatus can also visualize a two-dimensional image data set.

Although in the above described embodiments the image data set is firstly smoothed, then reduced, then the differential properties are determined, after that the assignment procedure is performed, and finally the assigned visualization properties are displayed, in another embodiment the sequence of these operations can be different. Furthermore, certain operations can be omitted. For example, the resolution reducing operation could be omitted.

Although, in the above described embodiments the local differential properties determined for a voxel are preferentially the eigenvalues of the Hesse matrix, also other local differential properties can be determined, for example, gradiant magnitudes, radiant direction vectors, Hesse matrix eigenvectors, structure tensor properties et cetera.

In an embodiment, the differential property determination unit is adapted to determine a weakest eigenvalue of a local Hesse matrix, a local shape index and a mean local shape index for the different regions as local differential properties. The differential property determination unit is adapted to determine the mean local shape index by computing the local shape index for each region, preferentially for each voxel, and to apply a Gaussian smoothing filter to the image data set of the region-wise, preferentially voxel-wise, local shape index values.

The local shape index is preferentially a value which is based on the curvature of an isophote surface through the respective region of the image data set which is preferentially comprised of a two-dimensional or three-dimensional gray-value volume. The isophote surface is preferentially implicitly defined as the surface orthogonal to a gradient vector at the respective region, for example, at the respective voxel.

Using the implicitly given isophote contour, the shape index $$S = \frac{2}{\pi} \arctan \frac{k_2 + k_1}{k_2 - k_1}, k_1 \ge k_2 \quad (5)$$

is then formed from the two eigenvalues $k_1$ and $k_2$ of the matrix $H'=PH$ which is derived from the local Hesse-matrix H, after the direction of the normalized gradient g has been eliminated by virtue of the projector matrix $P=I-gg^t$ (where I is the identity matrix). The contributions of the gradient vector g are eliminated because we are interested only in the curvature perpendicular to the isophote surface normal which is given by the gradient vector g. The Hesse matrix H is established from the six independent second derivatives:

$$H = \begin{bmatrix} g_{xx} g_{xy} g_{xz} \\ g_{yx} g_{yy} g_{yz} \\ g_{zx} g_{zy} g_{zz} \end{bmatrix}. \quad (6)$$

The projector matrix P eliminates all components which are aligned with the gradient vector g from the Hesse matrix H, and therefore the matrix $H'=PH$ has only two non-vanishing eigenvalues $k_1$ and $k_2$.

For a smooth convex and regular nodule surface, the local shape index yields positive values close to +1 everywhere on the surface. Around any spiculi or attached vessels, the local shape index becomes smaller or negative, thus decreasing the overall mean shape index on the nodule surface. A more detailed discussion of the local shape index is, for example, disclosed in the article "Agreement of CAD features with expert observer ratings for characterization of pulmonary nodules in CT using the LIDC-IDRI database", Rafael Wiemker et al., SPIE Medical Imaging 2009, SPIE vol. 7260, which is herewith incorporated by reference.

In this embodiment, the assigning unit is adapted to assign a color saturation depending on the weakest eigenvalue of the local Hesse matrix and a color hue depending on the mean local shape index, to the different regions, in particular, to the different voxels. Preferentially, the mean local shape index is mapped to a color scale being the hue value H in an HSV color system. For example, a mean local shape index of 1.0 is mapped to green for indicating a low likelihood of malignancy and a mean local shape index of zero or smaller than zero is mapped to red for indicating a high likelihood of malignancy. The mean local shape index is therefore preferentially mapped onto a malignancy color scale, for example, green-to-red, by the assigning unit for determining a color hue of a region, in particular, of a voxel. The saturation S of the HSV color system of each region, in particular, of each voxel, is given by the strength of the feature which enhances nodular structures. In this embodiment, the saturation S is given by the weakest eigenvalue of the local Hesse matrix. The saturation S is zero for a vanishing third eigenvalue of the Hesse matrix, i.e. "blobness" equal to zero. The intensity value V of the HSV color system is preferentially depending on the image value of the region of the respective image data set, in particular depending on the Hounsfield value of the respective region of the image data set. If the region is comprised of several voxels, the intensity value V is preferentially depending on an average of the image values of the voxels of the respective region. In a preferred embodiment, the intensity value V is equal to the Hounsfield value or average Hounsfield unit, respectively, of the respective region. The assigning unit is preferentially further adapted to convert the HSV values for each region into RGB values using well known formulas. The display unit is preferentially adapted to display the colors assigned to the regions, in particular, assigned to the voxels, wherein preferentially non-nodular anatomy is rendered as gray-shade background, i.e. with zero color saturation, for providing a visual orientation to the user.

The colored voxels are preferentially shown in the first display region by using a rendering technique like a maximum intensity projection technique. As already mentioned above, the visualization can be rotated within the first display region and a user can indicate a location within the first display region, wherein a corresponding location in the originally provided image data set is shown in the second display region.

Due to the color coding of the local geometric properties anomalous structures like nodules and lymph nodes can stand out visually with the color saturation reflecting the existence of an anomaly as such and the color hue reflecting its possible malignancy. An explicit segmentation of specific tumor candidates and an analysis of a segmentation shape are not necessary, because the malignancy features over a certain area are preferentially collected by voxel-wise filtering on a larger resolution scale.

Preferentially, tumors and their potential malignancy are outstanding visually by the described color coding but not explicitly marked or weighted by probability numbers. Since the determination of the visualization properties, in particular, of the colors, does not comprise an explicit segmentation, it is not prone to the normal misclassification problems which come along with binary classification decisions and it is highly parallelizable for multicore processors. Since the rendering preferentially relies on differential geometric operators, it is generally not sensitive to absolute thresholds or intensity values such as Hounsfield values, and since the differential geometric operators used by the differential property determination unit for determining the local differential properties require only very basic and local mathematical operations, the computations are ideally suited to be carried out on graphical processing units (GPUs).

The visualization apparatus and method can be implemented as a software algorithm to provide a quick overview with navigation functionality over three-dimensional volume image data sets like computed tomography or magnetic resonance image data sets, in particular, for single organs like the lung or the breast, body parts like the thorax, or whole body images.

Preferentially, local features combined from differential geometric properties on different resolutions scales which have been found to correlate with tumor malignancy are color coded. Nodular structures like tumors or lymph nodes can be shown using greenish color hues and malignancy features can be mixed in using red hues. This can steer the visual attention of the user intuitively towards the more actionable tumors, without cluttering the original image data set with numbers and graphical symbols. Any point of interest in the navigator rendering, i.e. in the first display region, can preferentially be clicked on and the user will then be referred to the corresponding position in the originally image data set shown in the second display region for further visual inspection. Since the local differential properties are preferentially precomputed, the rendering can be modified interactively in real time.

The visualization apparatus is preferably adapted to visualize an image data set such that the paradigm of Computer Aided Visualization and Analysis (CAVA) for distinction with respect to classical CADe/CADx approaches is fullfilled. This paradigm postulates no explicit classification, i.e. e.g. no labelling of regions, in particular, of voxels, to discrete classes, i.e. "all voxels are created equal". The paradigm postulates further no object list of tumor candidates, no segmentation, i.e. e.g. no delineation, of tumor candidates, no explicit graphical markers such as arrows or circles, no explicit likelihood numbers, and no change of the original image data set, only co-registration with an additional enhanced rendering. The visualization property is instead preferentially adapted to exploit the whole color space, i.e. e.g. intensity, hue, saturation, wherein the various differential geometric properties are combined to a blended color, and to intuitively convey this information to the user by projecting the color values of all voxels of the image volume into an overview using an appropriate volume rendering like maximum intensity projection, wherein the cognitive part and the decisions are left to the visual cortex of the user.

The visualization apparatus is preferentially adapted to implicitly enhance anomalies according to certain malignancy-related numerical features and to serve as a navigator in a three-dimensional image data set without making use of internal segmentation and detection algorithms. The visualization apparatus preferentially performs a color coding of local features combined from differential geometric properties on different resolutions scales which have been found to correlate with tumor malignancy.

As already mentioned above, an indication of malignancy of a tumor can be given by the mean local shape index, i.e. e.g. the local shape index averaged over a tumor volume. In an embodiment, this can be realized without an explicit segmentation of the tumor by applying a Gaussian filter which is equivalent to a weighted averaging over an area of the size of the width of the Gaussian filter. Appropriate widths of the Gaussian filter can be predefined, for example, by calibration. The mean local shape index as a malignancy feature can be multiplied with a feature indicating a presence of a tumor, in particular, with the strength of the weakest eigenvalue of the local Hesse matrix given that all eigenvalues of the local Hesse matrix are negative. The resulting feature can be regarded as local differential property to which a visualization property, in particular, a color, is assigned, wherein the visualization property is displayed by the display unit.

Figure 8:
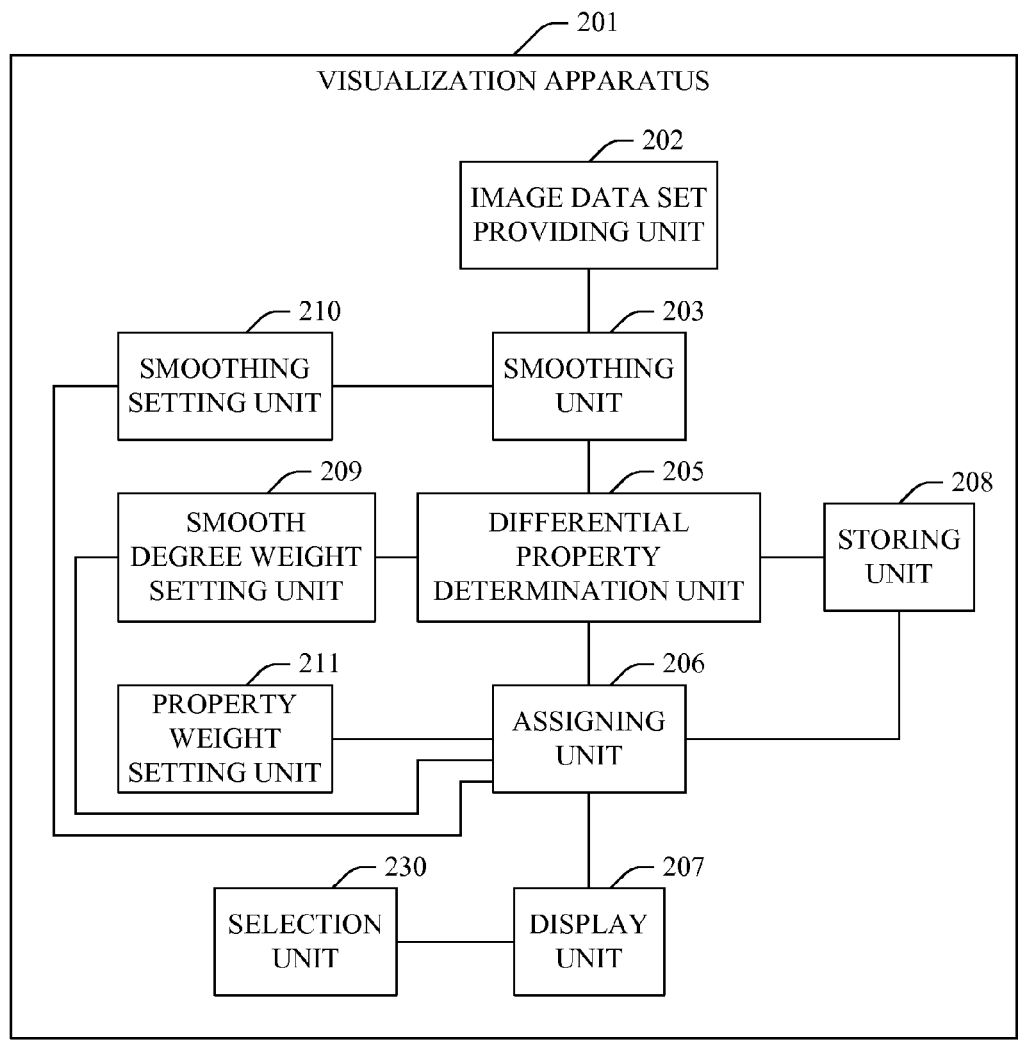
FIG. 8 shows schematically and exemplarily a further embodiment of a visualization apparatus for visualizing an image data set.
Figure 9:
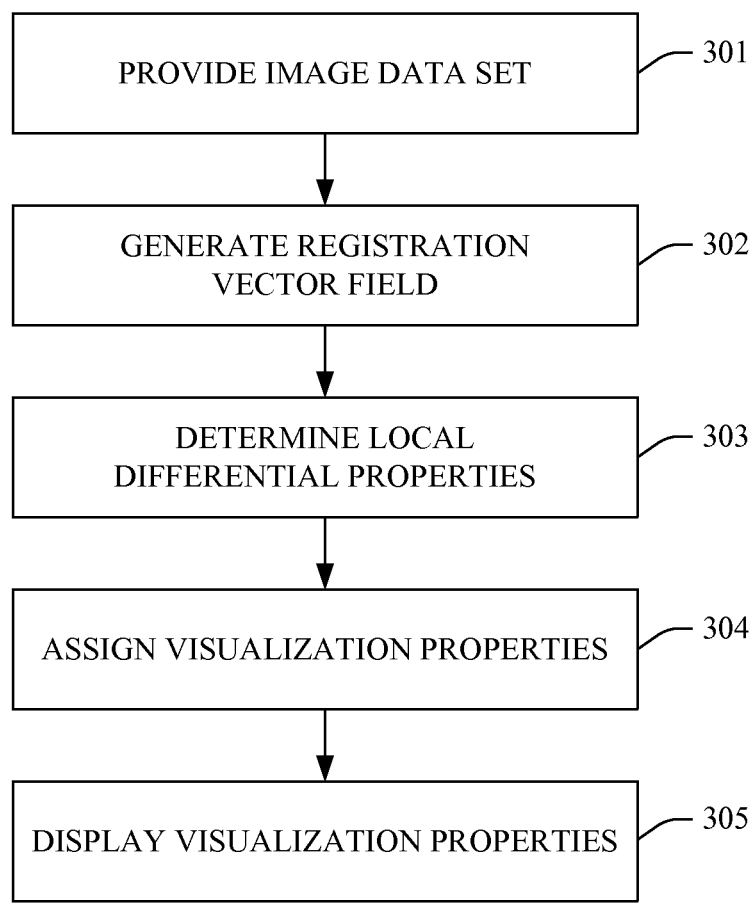
FIG. 9 shows a flowchart exemplarily illustrating a further embodiment of a visualization method for visualizing an image data set.

FIG. 8 shows schematically and exemplarily a further embodiment of a visualization apparatus for visualizing an image data set. The visualization apparatus 201 comprises an image data set providing unit 202 for providing a first image data set corresponding to a first time and a second image data set corresponding to a second time. The visualization apparatus 201 further comprises a smoothing unit 203 for smoothing the first image data set and the second image data set in accordance with a degree of smoothing. The degree of smoothing is preferentially set by a user by using a smoothing setting unit 210.

The visualization apparatus 201 further comprises a differential property determination unit 205 being adapted to a) generate a registration vector field defining a registration of the first image data set and the second image data set relative to each other and b) determine local differential properties of the registration vector field for different regions of the first image data set and/or the second image data set as the local differential properties.

In this embodiment, the differential property determination unit 205 is preferentially adapted to perform an elastic registration for generating the registration vector field. The first image data set and the second image data set show the same object at different times being the first time and the second time. The object is, for example, a tumor or a whole organ. The region is, in this embodiment, a voxel and the first and second image data sets are preferentially three-dimensional volume data sets of an imaging modality like a computed tomography apparatus or a magnetic resonance imaging apparatus.

The differential property determination unit 205 is adapted to determine for each voxel a three-dimensional registration vector which connects the corresponding voxel positions in the first image data set and the second image data set. The registration is preferentially an elastic registration which can be a known parametric elastic registration like a spline-based elastic registration or a non-parametric elastic registration.

The differential property determination unit 205 is adapted to determine eigenvalues of a local Jacobian matrix of the registration vector field as the local differential properties.

The visualization apparatus 201 further comprises an assigning unit 206 for assigning visualization properties to the different regions of the first image data set and/or the second image data set. The assigning unit 206 can be adapted to assign the visualization properties to the different regions depending on the sign of the eigenvalues. In particular, the assigning unit 206 can be adapted to assign a first visualization property to a region, if only the first eigenvalue of the region is positive, a second visualization property to a region, if only the first eigenvalue and the second eigenvalue of the region are positive, and a third visualization property to a region, if all eigenvalues of the region are positive, wherein the first, second and third visualization properties are different.

For each voxel a 3×3 Jacobian matrix is determined, wherein the 3×3 Jacobian matrix consists of the three partial derivatives with respect to the three spatial axes, for example, with respect to an x-, y- and z-axis, of the three spatial registration vector components. The partial derivatives can be computed by determining the change in the vector field, when the voxel is shifted along a spatial axis, for example, in the x-, y- or z-direction, wherein the change is determined for the three spatial components of the registration vector, for example, for the x, y and z component, independently, thus making up the 3×3 Jacobian matrix for each voxel. If the registration is a parametric registration which generates a parametric registration vector field, the Jacobian matrix can alternatively be determined directly from the local parameters of the parametric registration vector field.

In this embodiment, the assigning unit 206 is preferentially adapted to assign six colors to the positive and negative eigenvalues of the Jacobian matrix of a region, wherein these six colors are weighted by the magnitude of the eigenvalues and the weighted colors are averaged for generating a final rendering color for a region. Thus, to each combination of a possible sign, i.e. positive or negative, and an eigenvalue of the Jacobian matrix a color is assigned, resulting in six colors which are linearly combined, wherein the six colors are weighted by the magnitude of the respective eigenvalue.

The visualization apparatus 201 further comprises a display unit 207 for displaying the visualization properties assigned to the different regions of the first image data and/or the second image data set. Also the display unit 207 comprises a first display region and a second display region as described above with reference to, for example, FIG. 5. The assigned visualization properties are preferentially shown in the first display region.

The display unit 207 is preferentially adapted to project the color determined for the regions of the first and/or second image data set into a three-dimensional rendering on the first display region by means of, for example, a maximum intensity projection, wherein preferentially priority is given on each viewing ray to the region, in particular, to the voxel, with the highest Jacobian determinant. A selection unit 230 allows a user to select a position in the first display region, wherein the display unit 207 is adapted to indicate a corresponding position in the second display region which shows the first or the second original image data set. Thus, a click into the three-dimensional rendering image in the first display region refers to a corresponding three-dimensional position in the second display region, which shows the original three-dimensional image volume being the first image data set or the second image data set in, for example, an orthoviewer. The corresponding three-dimensional position in the second display region is the position of the voxel which contributes most significantly to the clicked position of the color-coded rendering.

For performing a maximum intensity projection for visualizing a three-dimensional image volume along each viewing ray the strongest voxel value of the three-dimensional image volume is preferentially selected for the two-dimensional projection image shown by the display unit. In addition to the two-dimensional projection image preferentially a so-called depth map is generated simultaneously, which stores the three-dimensional position of the selected strongest voxel value along each viewing ray. In a preferred embodiment, a two-dimensional projection image with its corresponding depth map is determined for each of the several features which are the determined local differential properties or combinations of the determined local differential properties. A color projection image can be computed by a linear superposition of the feature-specific two-dimensional maximum projection images using feature specific weights like property weights which are described below in more detail and which can be predefined or selected by a user via a property weight setting unit 211.

If a certain viewing ray is selected in the two-dimensional projection image shown in the first display region by using the selection unit 230, it can be determined which feature alone or multiplied with its feature weight is largest on the selected viewing ray, and it can be determined which depth map to use for looking up the three-dimensional position of the voxel from which the feature value originated from. In the second display region the looked up three-dimensional position in the first image data set or in the second image data set can be shown.

Similar to the image data set providing unit 2 described above with reference to FIG. 1, also the image data set providing unit 202 is preferentially a storing unit in which the first image data set and the second image data set are stored and from which the image data sets can be retrieved for providing the image data sets. However, the image data set providing unit 202 can also be a transfer unit allowing transferring the image data sets to the smoothing unit 203 for providing the first image data set and the second image data set.

Similar to the smoothing setting unit 10, also the smoothing setting unit 210 comprises preferentially a graphical user interface allowing a user to set and modify the degree of smoothing, wherein the graphical user interface can comprise a slide control for setting and modifying the degree of smoothing.

The visualization apparatus 201 further comprises a storing unit 208, wherein the smoothing unit 203 is adapted to smooth the first image data set and the second image data set several times in accordance with different degrees of smoothing for generating several differently smoothed image data sets. The differential property determination unit 205 is preferentially is adapted to determine several local differential properties of the different regions for the differently smoothed image data sets, i.e. in this embodiment for each voxel of the first image data set and the second image data set and for each degree of smoothing, i.e. for each resolution scale, features are determined being preferentially eigenvalues of a local Jacobian matrix of the determined registration vector field. The storing unit 208 is adapted to store the several local differential properties of the different regions determined for the differently smoothed image data sets. This is performed for a certain number of degrees of smoothing, which can be predefined or which can be selected by a user. If a certain degree of smoothing is selected by a user by using the smoothing setting unit 210, the assigning unit 206 retrieves from the storing unit 208 the local differential properties which have been determined for smoothed first and second image data sets which correspond to the selected degree of smoothing and the assigning unit 206 assigns the visualization properties to the different regions of the image data set depending on the retrieved local differential properties. The cooperation of the storing unit, the smoothing setting unit, the assigning unit, and the smoothing unit is similar to the corresponding cooperation described above with reference to FIG. 1.

The assigning unit 206 can be adapted to combine the determined local differential properties in accordance with following equation:

$$I_c[x] = \sum_{f,s} C(f, s, c)W(f, s)F(f, s)[x]. \tag{7}$$

The color for a spatial position x within the first image data set or the second image data set is described by three intensity values $I_c$ where c denotes the R, G, B-channel (red, green, blue—channel). The respective intensity $I_c$ is the result of a summation over the features f, i.e. the determined local differential properties or combinations of the determined local differential properties, and the degrees of smoothing s, which can also be regarded as resolution scales, for each color channel c. The feature values F(f,s)[x] are computed for each position x, for each feature, f and on each resolution scale s. The feature values are, for example, the eigenvalues of the local Jacobian matrix. A weight matrix W(f, s) gives a weight specifically for each feature f and each resolution scale s. Thus, if, for example, a smoothing weight has been chosen by a user by using the smooth degree weight setting unit 209 and if a property weight has been chosen by user by using a property weight setting unit 211, these weights are preferentially input into the weight matrix, in particular, these two weights are multiplied and input into the weight matrix. A color matrix C(f,s,c) gives an intensity value for each feature f, each resolution scale or degree of smoothing s in each color channel c={R,G,B}. Preferentially, for a given color channel c the features are stored in a one-dimensional vector F multiplied with the two-dimensional weight matrix W and a one-dimensional transposed color contribution vector C to yield the scalar value $I_c$.

The smoothed degree weight for the weight matrix W is preferentially set by using the smooth degree weight setting unit 209 being similar to the smooth degree weight setting unit 9 described above with reference to FIG. 1.

The property weight setting unit 211 is adapted to allow a user to set property weights for weighting the features, in particular, the local differential properties, of the same region of the image data set. Similar to the property weight setting unit 11 described above with reference to FIG. 1, also the property weight setting unit 211 comprises preferentially a graphical user interface for allowing a user to set and modify the property weights.

As already mentioned above, the smoothing unit 203 can be used for smoothing the first image data set and the second image data set in accordance with a desired degree of smoothing for generating a registration vector field on several resolution scales and for determining the eigenvalues of the local Jacobian matrix for the desired degree of smoothing, i.e on each resolution scale. A user can set the desired degree of smoothing by using the smoothing setting unit 210. The assigning unit 206 can be adapted to combine eigenvalues of the Jacobian matrix determined for different degrees of smoothing for determining a local differential property, wherein a color is assigned to this local differential property. The elastic registration and the analysis of the local Jacobian matrix can therefore be computed on different spatial resolution scales, wherein the rendering color is composed using smooth degree weights, which can also be regarded as scale-weights and which can be set by a user using the smooth degree weight setting unit 209.

Moreover, also in this embodiment a resolution reduction unit can reduce the resolution of the first image data set and of the second image data set or of the registration vector field, for allowing to determine the eigenvalues of the Jacobian matrix for a reduced resolution.

The Jacobian color rendering can be overlaid on a gray-value rendering of the object, in particular, of the tumor, in order to improve spatial orientation. In particular, a color image derived from the local Jacobian properties is preferentially superimposed with a maximum intensity projection of the image gray values of the first image data set or the second image data set. This maximum intensity projection, which can be regarded as a conventional maximum intensity projection, can be superimposed as gray values, i.e. with zero color saturation, such that the observer perceives it as a background to the color image generated from the local Jacobian features.

In the following a visualization method for visualizing an image data set will be exemplarily described with reference to a flowchart shown in FIG. 8.

In step 301, a first image data set of an object corresponding to a first time and a second image data set of the object corresponding to a second time are provided. In step 302, a registration vector field defining a registration of the first image data set and the second image data set relative to each other is generated, and in step 303 local differential properties of the registration vector field for different regions of the first image data set or the second image data set are determined as local differential properties. In particular, eigenvalues of a local Jacobian matrix of the registration vector field are determined as local differential properties.

In step 304, visualization properties are assigned to the different regions of the first image data set and/or the second image data set depending on the determined local differential properties, wherein a visualization property defines the visualization of a region, to which the visualization property is assigned. In step 305, the visualization properties assigned to the first image data set and/or the second image data set are displayed.

Also in this embodiment which relates to the Jacobian matrix the computation is completely parallelizable, in particular, by regions, by resolutions or by degrees of smoothing, and can thus be performed on a dedicated co-processor, multiprocessor-computer, distributed computers, or a hardware graphics card like a GPU. The Jacobian rendering can be modified by use of cut-planes or pre-segmentations such that only certain organ parts are rendered and less organ parts are obstructed by projection, Since the Jacobian color coding results in a color coding of local growth characteristics, the user can very quickly appraise locally varying object growth patterns, in particular, tumor growth patterns, without using explicit CADx algorithms. The growth patterns may be typical for irregular cancerous growth versus more isotropic growth due to inflammations and scarring. The smooth setting unit allows a user to interactively change the scale the user is interested in, i.e. small objects versus larger objects. Moreover, noise is not problematic as it becomes automatically less important in higher degrees of smoothing. The user can interactively change towards the noise level which the user finds acceptable.

The above described embodiment which is based on the Jacobian matrix analysis can be implemented in software and/or hardware to provide a three-dimensional rendering of the local growth characteristics of an object like a tumor or a whole organ between two or more time points. An advantage is the color coding of locally varying growth properties, which can be provided for different degrees of smoothing, i.e. which can be provided on different resolution scales, and which may allow intuitive visual recognition of typically malignant growth patterns, without the use of explicit CADx tools or segmentation algorithms. Different color hues and color intensities are preferentially shown for locally one-, two-, or three-dimensional growth. To achieve this, the eigenvalues of the Jacobian matrix of the registration vector field delivered by an elastic registration between the images of the two or more time points are computed for each image region, in particular, for each image voxel, wherein a fixed color is preferentially assigned to each eigenvalue, and a display color is composed by blending of the appropriate Jacobian eigenvalue contributions. The display color for each region is then preferentially projected onto a viewport being preferentially the first display region of the display unit using, for example, a maximum intensity projection technique. Any point of interest in the three-dimensional Jacobian rendering can be clicked on and the user is then referred to the corresponding position in the original first image data set or second image data set for further visual inspection. Since the eigenvalues are preferentially precomputed, in particular, for different degrees of smoothing and/or different reduced resolutions, the rendering can be modified interactively in real time.

Although in the above described embodiments a degree of smoothing is preferentially set by a user by using a smoothing setting unit, wherein a smoothing unit smoothes the image data sets in accordance with the degree of smoothing, the degrees of smoothings can also be predefined, wherein the different image data sets are smoothed in accordance with the different degrees of smoothing and wherein the differently smoothed image data sets may be stored in a storing unit.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like the determination of the local differential properties, the smoothing of the image data set, the resolution reduction, the assigning of a visualization property to a region of the image data set, and the display, in particular, the rendering of the assigned visualization properties, which are performed by one or more units or devices can be performed by any other number of units or devices. For example, the determinations, smoothing operations, resolution reduction operations, assigning operations, and display operations can be performed by a single unit or by any other number of different units. The determination, smoothing, resolution reducing, assigning, and/or display operations and/or the control of the visualization apparatus in accordance with the visualization method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a visualization apparatus for visualizing an image data set. The visualization apparatus comprises an image data set providing unit for providing the image data set, a differential property determination unit for determining local differential properties for different regions of the image data set, an assigning unit for assigning visualization properties to the different regions of the image data set depending on the determined local differential properties, wherein a visualization property defines the visualization of a region, to which the visualization property is assigned, and a display unit for displaying the visualization properties assigned to the different regions of the image data set. By displaying the visualization properties assigned to the different regions of the image data set different objects can visually be separated from each other without requiring large computational costs.

The invention claimed is:

1. A visualization apparatus, comprising:
   a differential property determination unit, implemented through a computer processor, that determines local differential properties for different regions of an image data set, including several local differential properties for a same region of the different regions of the image data set,
   a property weight setting unit, implemented through the computer processor, that allows a user to set property weights for the weighted combination of the several local differential properties of the same region of the image data set;
   an assigning unit, implemented through the computer processor, that assigns visualization properties to the different regions of the image data set depending on the determined local differential properties, including assigning a visualization property to a weighted combination of the several local differential properties of the same region, wherein a visualization property defines the visualization of a region, to which the visualization property is assigned,
   a hardware storing unit for storing the determined several local differential properties of the same region of the different regions of the image data set,
   wherein, if property weights are set by using the property weight setting unit, the assigning unit is adapted to retrieve from the hardware storing unit the local differential properties of the same region and to assign a visualization property to a weighted combination of the several retrieved local differential properties in accordance with the property weights set by using the property weight setting unit; and
   a display unit that displays the visualization properties assigned to the different regions of the image data set.

2. The visualization apparatus as defined in claim 1, wherein the visualization apparatus further comprises a smoothing unit, implemented through the computer processor, that smooths the image data set in accordance with a degree of smoothing.

3. The visualization apparatus as defined in claim 2, wherein the visualization apparatus comprises a smoothing setting unit, implemented through the computer processor, that allows a user to set the degree of smoothing.

4. The visualization apparatus as defined in claim 3, wherein the visualization apparatus comprises a hardware storing unit, wherein the smoothing unit is adapted to smooth the image data set several times in accordance with different degrees of smoothing for generating several differently smoothed image data sets, wherein the differential property determination unit is adapted to determine several local differential properties of the different regions for the differently smoothed image data sets, wherein the storing unit is adapted to store the several local differential properties of the different regions determined for the differently smoothed image data sets, wherein, if a degree of smoothing is set by using the smoothing setting unit, the assigning unit is adapted to retrieve from the storing unit the local differential properties, which have been determined for a smoothed image data set which corresponds to the set degree of smoothing, and to assign the visualization properties to the different regions of the image data set depending on the retrieved local differential properties.

5. The visualization apparatus as defined in claim 2, wherein the differential property determination unit is adapted to determine the several local differential properties of the same region for different degrees of smoothing of the image data set, wherein the visualization apparatus further comprises a smooth degree weight setting unit, implemented through the computer processor, that allows a user to set smooth degree weights for the weighted combination of the several local differential properties.

6. The visualization apparatus as defined in claim 5, wherein the visualization apparatus comprises a hardware storing unit that stores the several local differential properties of the same region determined for the different degrees of smoothing of the image data set, wherein, if smooth degree weights are set by using the smooth degree weight setting unit, the assigning unit is adapted to retrieve from the storing unit the several local differential properties of the same region and to assign the visualization property to a weighted combination of the several retrieved local differential properties in accordance with the smooth degree weights set by using the smooth degree weight setting unit.

7. The visualization apparatus as defined in claim 1, wherein the visualization apparatus further comprises a resolution reduction unit, implemented through the computer processor, that reduces the resolution of the image data set.

8. The visualization apparatus as defined in claim 1, wherein the differential property determination unit is adapted to determine at least one of an eigenvalue of a local Hesse matrix and a local shape index as local differential properties.

9. The visualization apparatus as defined in claim 8, wherein the differential property determination unit is adapted to determine at least one of a) a weakest eigenvalue of a local Hesse matrix, and b) a mean local shape index by determining the local shape index for the different regions of the image data set and averaging the local shape index determined for the different regions, as the local differential properties.

10. The visualization apparatus as defined in claim 9, wherein the assigning unit is adapted to assign at least one of a) a color saturation depending on the weakest eigenvalue of the local Hesse matrix, and b) a color hue depending on the mean local shape index, to the different regions.

11. The visualization apparatus as defined in claim 1, wherein the display unit comprises a first display region and a second display region, wherein the display unit is adapted to display the visualization properties assigned to the different regions in the first display region and to display image values of the provided image data set in the second display region, wherein the visualization apparatus comprises a selection unit, implemented through the computer processor, that allows a user to select a position in the first display region, wherein the display unit is adapted to indicate a corresponding position in the second display region.

12. The visualization apparatus as defined in claim 1, wherein
the image data set providing unit is adapted to provide a first image data set of an object corresponding to a first time and a second image data set of the object corresponding to a second time,
the differential property determination unit is adapted to
generate a registration vector field defining a registration of the first image data set and the second image data set relative to each other, and
determine local differential properties of the registration vector field for different regions of the first image data set or the second image data set as the local differential properties.

13. The visualization apparatus as defined in claim 12, wherein the differential property determination unit is adapted to perform an elastic registration for generating the registration vector field.

14. The visualization apparatus as defined in claim 12, wherein the differential property determination unit is adapted to determine eigenvalues of a local Jacobian matrix of the registration vector field as the local differential properties.

15. The visualization apparatus as defined in claim 14, wherein the assigning unit is adapted to assign the visualization properties to the different regions depending on the sign of the eigenvalues.

16. The visualization apparatus as defined in claim 15, wherein the assigning unit is adapted to assign
a first visualization property to a region, if only the first eigenvalue of the region is the positive,
a second visualization property to a region, if only the first eigenvalue and the second eigenvalue of the region are positive,
a third visualization property to a region, if all eigenvalues of the region are positive, wherein the first, second and third visualization properties are different.

17. A non-transitory readable medium storing a computer program, which, when executed by a computer processor, causes the computer processor to:
smoothing image data set in accordance with a degree of smoothing:
determine local differential properties for different regions of the smoothed image data set, including several local differential properties for a same region of the different regions of the smoothed image data set;
receive a user input selecting a set of smooth degree weights for a weighted combination of the several local differential properties; and
assign visualization properties to the different regions of the image data set depending on the determined local differential properties, including assigning a visualization property to the weighted combination of the several local differential properties of the same region, wherein a visualization property defines the visualization of a region, to which the visualization property is assigned.

* * * * *